US012652607B2

(12) United States Patent
Kneckt et al.

(10) Patent No.: US 12,652,607 B2
(45) Date of Patent: Jun. 9, 2026

(54) PRIVACY ENHANCEMENT BEACON FRAMES

(71) Applicant: Apple Inc., Cupertino, CA (US)

(72) Inventors: Jarkko L. Kneckt, Los Gatos, CA (US); Yong Liu, Campbell, CA (US); Charles F. Dominguez, San Carlos, CA (US); Daniel R. Borges, San Francisco, CA (US); Debashis Dash, San Jose, CA (US); Elliot S. Briggs, Santa Cruz, CA (US); Sidharth R. Thakur, Los Gatos, CA (US); Su Khiong Yong, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 526 days.

(21) Appl. No.: 18/112,774

(22) Filed: Feb. 22, 2023

(65) Prior Publication Data

US 2023/0319688 A1 Oct. 5, 2023

Related U.S. Application Data

(60) Provisional application No. 63/321,521, filed on Mar. 18, 2022.

(51) Int. Cl.
*H04W 48/08* (2009.01)
*H04W 12/02* (2009.01)
(Continued)

(52) U.S. Cl.
CPC ........... *H04W 48/08* (2013.01); *H04W 12/02* (2013.01); *H04W 12/037* (2021.01); *H04W 48/16* (2013.01)

(58) Field of Classification Search
CPC ............................ H04W 84/12; H04W 12/037
(Continued)

(56) References Cited

U.S. PATENT DOCUMENTS

2013/0142094 A1* 6/2013 HomChaudhuri ...........................
H04W 52/0212
370/311
2013/0219235 A1* 8/2013 Ohba ..................... G11C 29/26
714/718
(Continued)

FOREIGN PATENT DOCUMENTS

KR 20150012255 A 2/2015

OTHER PUBLICATIONS

Janne Lindqvist et al. "Privacy-Preserving 802.11 Access-Point Discovery", Proceedings of the 2$^{nd}$ ACM Conference on Wireless Network Security: Zurich, Switzerland, Suite 701, New York, NY 10121-0701, Mar. 16, 2009, pp. 123-130.
(Continued)

*Primary Examiner* — Fabricio R Murillo Garcia
(74) *Attorney, Agent, or Firm* — Sterne, Kessler, Goldstein & Fox P.L.L.C.

(57) ABSTRACT

Embodiments are disclosed for privacy enhancement (PE) beacon frames. A PE station (STA) can receive a PE beacon frame comprising a media access control (MAC) header that includes a first random identifier (ID) and a first checksum ID, determine that configured beacon parameters are satisfied, and then receive the PE beacon frame. When the first random ID and the first checksum ID correspond to an affiliated PE access point (AP) of a PE AP multilink device (MLD), to identify the PE AP MLD the PE STA can determine a checksum value using a AP MLD ID of the PE AP MLD and the first random ID, and based on a comparison of the determined checksum value with the first checksum ID, identify the PE AP MLD. In some embodiments, a location of a change sequence number adjacent to the MAC header enables early termination of the PE beacon frame reception.

20 Claims, 19 Drawing Sheets

(51) Int. Cl.
_H04W 12/037_ (2021.01)
_H04W 48/16_ (2009.01)

(58) Field of Classification Search
USPC ........................................................ 455/434
See application file for complete search history.

(56) References Cited

U.S. PATENT DOCUMENTS

| | | | |
|---|---|---|---|
| 2015/0085849 A1 | 3/2015 | Kim et al. | |
| 2016/0135053 A1 | 5/2016 | Lee et al. | |
| 2016/0192273 A1* | 6/2016 | Oren ................... | H04W 40/244 |
| | | | 370/329 |
| 2016/0337783 A1* | 11/2016 | Seok ......................... | H04L 1/16 |
| 2016/0345277 A1* | 11/2016 | Segev ................. | H04W 56/001 |
| 2017/0070948 A1* | 3/2017 | Kim ...................... | H04W 48/20 |
| 2018/0324142 A1* | 11/2018 | Adrangi .............. | H04L 63/0414 |
| 2019/0208470 A1* | 7/2019 | Asterjadhi ........ | H04W 52/0229 |
| 2021/0352474 A1* | 11/2021 | Bajko ................... | H04W 12/06 |
| 2021/0368419 A1* | 11/2021 | Kwon ................... | H04W 48/16 |

OTHER PUBLICATIONS

Philip Hawkes (Qualcomm): "Initial Privacy Enhancement Requirements", IEEE Draft; 11-22-0107-02-00BI-Initital-Privacy-Enhancement-Requirements, IEE-SA Mentor, Piscataway, NJ, USA, vol. 802.11bi, No. 2, Mar. 1, 2022, pp. 1-27.

Extended European Search Report directed to related European Application No. 23161750.7, mailed Jul. 6, 2023; 10 pages.

Office Action for Korean Application No. 10-2023-0034543, with translation attached, mailed on May 3, 2025, 4 pages.

IEEE P802. I IREVme_D0.0, Draft Standard for Information technology—Telecommunications and Information Exchange between Systems Local and Metropolitan Area Networks—Specific Requirements, Part 11: Wireless LAN Medium Access Control (MAC) and Physical Layer (PHY) Specifications; 4,608 pages.

* cited by examiner

350

| Type value B3 B2 | Type description | Subtype value B7 B6 B5 B4 | Subtype description |
|---|---|---|---|
| 00 | Management | 0011 | Reassociation Response |
| 00 | Management | 0100 | Probe Request |
| 00 | Management | 0101 | Probe Response |
| 00 | Management | 0110 | Timing Advertisement |
| 00 | Management | 0111 | Reserved |
| 00 | Management | 1000 | Beacon |
| 00 | Management | 1001 | ATIM |
| 00 | Management | 1010 | Disassociation |
| 00 | Management | 1011 | Authentication |
| 00 | Management | 1100 | Deauthentication |
| 00 | Management | 1101 | Action |
| 00 | Management | 1110 | Action No Ack |
| 00 | Management | 1111 | Reserved |
| 01 | Control | 0000-0001(11ax) | Reserved |
| 11 | Extension | 0000 | DMG Beacon |
| 11 | Extension | 0001 | S1G Beacon |
| 11 | Extension | 0010-1111 | Reserved |

| A1 414 | A2 (first 3 octets) 436 | A2 (last 3 octets) 438 | A3 418 |
|---|---|---|---|
| Random ID 440 | | Checksum ID 445 | |

450

| A1 414 | A2 (first 2 octets) 462 | Reserved (2 octets) 464 | A2 (last 2 octets) 468 | A3 418 |
|---|---|---|---|---|
| Random ID 470 | | Reserved 472 | Checksum ID 475 | |

500

600

PE AP MLD 610
w/AP MLD ID 605

PE AP 611
Random ID 1,
Checksum ID 1

PE AP 612
Random ID 2,
Checksum ID 2

PE AP 613
Random ID 3,
Checksum ID 3

PE STA (non-MLD) 620
AP MLD ID 605

800

Reduced Neighbor Report (RNR) Element 850

| Element ID | Length | Neighbor AP Info 852 | Neighbor AP Info | | Neighbor AP Info |
|---|---|---|---|---|---|

852

Neighbor AP Info

| TBTT Info Header 860 | Operating Class | Channel Number | TBTT Info Set (same size) | | |
|---|---|---|---|---|---|
| | | | TBTT Info 870 | TBTT Info | ... | TBTT Info |

870

TBTT Info Field

| Neighbor AP TBTT Offset | BSSID (optional) | Short SSID (optional) | BSS Parameters 880 | 20 MHz PSD | MLD Parameters 890 |
|---|---|---|---|---|---|

1020

| TBTT Info Header | | |
|---|---|---|
| TBTT Info Field Type (=0) | Reserved | TBTT Info Count | TBTT Info Length (= 14) |

| TBTT Info Field | | | | |
|---|---|---|---|---|
| Neighbor AP TBTT Offset | Random AP ID 1032 | Checksum ID 1034 | PE MBSSID Size 1036 | 20 MHz PSD (6GHz) |
| 1 octet | 6-9 *octets | 6-9 *octets | 1 octet | 1 octet |

PRIVACY ENHANCEMENT BEACON FRAMES

CROSS-REFERENCE TO RELATED APPLICATION

This application claims benefit of U.S. Provisional Patent Application No. 63/321,521, filed on Mar. 18, 2022, which is incorporated herein by reference in its entirety.

BACKGROUND

Field

The embodiments relate generally to wireless devices and beacons transmitted in a wireless communication system.

Related Art

Wireless local area network (WLAN) communications are described in IEEE P802.11REVme_D1.0, Draft Standard for Information technology-Telecommunications and information exchange between systems Local and metropolitan area networks-Specific requirements, Part 11: Wireless LAN Medium Access Control (MAC) and Physical Layer (PHY) Specifications "IEEE P802.11REVme".

SUMMARY

Some embodiments include a system, apparatus, article of manufacture, method, and/or computer program product and/or combinations and/or sub-combinations thereof, for privacy enhanced (PE) beacon frames. Some embodiments simplify PE beacon reception for associated PE STAs. PE beacon reception repeats often and some embodiments enable a PE STA to terminate PE beacon reception when no changes to PE BSS elements are expected. Thus, the PE STA can reduce power consumption. Conversely, when changes to PE BSS elements are expected, the PE beacon can inform the PE STA of the forthcoming changes, provide timing associated with when the changes are expected, and provide new values (e.g., addresses) that enable the PE STA to maintain association and utilize wireless services accordingly. To receive a PE beacon, an associated PE STA uses a random ID from the PE beacon, and a PE AP ID to perform a checksum calculation. The result of the checksum calculation can be compared with a checksum ID from the PE beacon, and if the comparison yields a substantial match, then the PE STA can confirm (e.g., discover) the PE AP that transmitted the PE beacon.

Some embodiments include a PE station (STA) that can receive a PE beacon frame with a media access control (MAC) header that includes a first random identifier (ID) and a first checksum ID. The PE STA can determine that the first random ID and the first checksum ID satisfy configured PE beacon parameters, and process the PE beacon frame responsive to the determination.

In some embodiments, the MAC header includes an extension type and subtype corresponding to an encrypted PE beacon frame or a PE discovery beacon frame. In some embodiments, the MAC header also includes a broadcast address. In some examples, the first random ID comprises at least 8 octets (e.g., 8 or 9 octets.) In some embodiments, the first random ID and the first checksum ID correspond to an affiliated PE access point (AP) of a PE AP multilink device (MLD). To identify the PE AP MLD, the PE STA can select an AP MLD ID of the PE AP MLD, determine a checksum value using the AP MLD ID and the first random ID, and determine whether the first checksum ID satisfies the checksum value.

In some embodiments, an encrypted change sequence number is adjacent to the MAC header in the PE beacon frame. The PE STA can determine whether the change sequence number is the same the change sequence number of a previous PE beacon frame, and terminate reception of one or more remaining portions of the PE beacon frame when the change sequence number has changed. The PE STA can associate with a PE AP, and determine whether one or more elements of a PE basic service set (BSS) corresponding to the PE AP will be updated. In some embodiments, the one or more elements of the PE BSS identifies a number of target beacon transmission times (TBTTs) until a second PE beacon frame including an update of the one or more elements is received.

In some embodiments, the PE beacon frame includes a non-encrypted reduced neighbor report (RNR) element that includes a second random ID, a second checksum ID, and a PE multiple basic service set ID (MBSSID) size corresponding to a first neighbor PE AP. The PE MBSSID size corresponds to a size of encrypted PE BSS information of the first neighbor PE AP. When the first neighbor PE AP is affiliated with a PE AP MLD, the encrypted PE BSS information includes a second RNR for maintaining one or more links of the PE AP MLD with at least one other neighbor PE AP affiliated with the PE AP MLD.

The PE STA can determine a target PE beacon transmission time (TPBTT) comprising a random time offset from a TBTT, where the TPBTT does not change a timing synchronization function (TSF) timer corresponding to a PE AP transmitting the PE beacon frame. The TPBTT can occur during a PE beacon randomization window duration that is based on a percentage of the TBTT.

Some embodiments include a PE AP that can configure a PE beacon frame with a MAC header that includes a first random identifier (ID) and a first checksum ID that correspond to the PE AP, where the MAC header includes an extension type and subtype corresponding to an encrypted PE beacon or a PE discovery beacon. The PE AP can transmit the PE beacon frame at a TPBTT. In some embodiments, the TPBTT is based at least in part on a random time offset from a TBTT, where the TPBTT does not change a TSF timer of the PE AP. In some embodiments, the PE AP is affiliated with a PE AP MLD. The PE beacon frame can include a non-encrypted RNR element that includes a second random ID, a second checksum ID, and a PE MBSSID size corresponding to a neighbor PE AP, where the neighbor PE AP is also affiliated with the PE AP MLD. The PE MBSSID size can correspond to a size of encrypted PE BSS information of the neighbor PE AP.

Further embodiments, features, and advantages of the present disclosure, as well as the structure and operation of the various embodiments of the present disclosure, are described in detail below with reference to the accompanying drawings.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIGS. 3A-3C illustrate example fields for PE beacon frame type detection, according to some embodiments of the disclosure.

FIGS. 10A-10D illustrate examples of non-encrypted PE RNR element fields of a PE discovery beacon frame, according to some embodiments of the disclosure.

Figure 1:
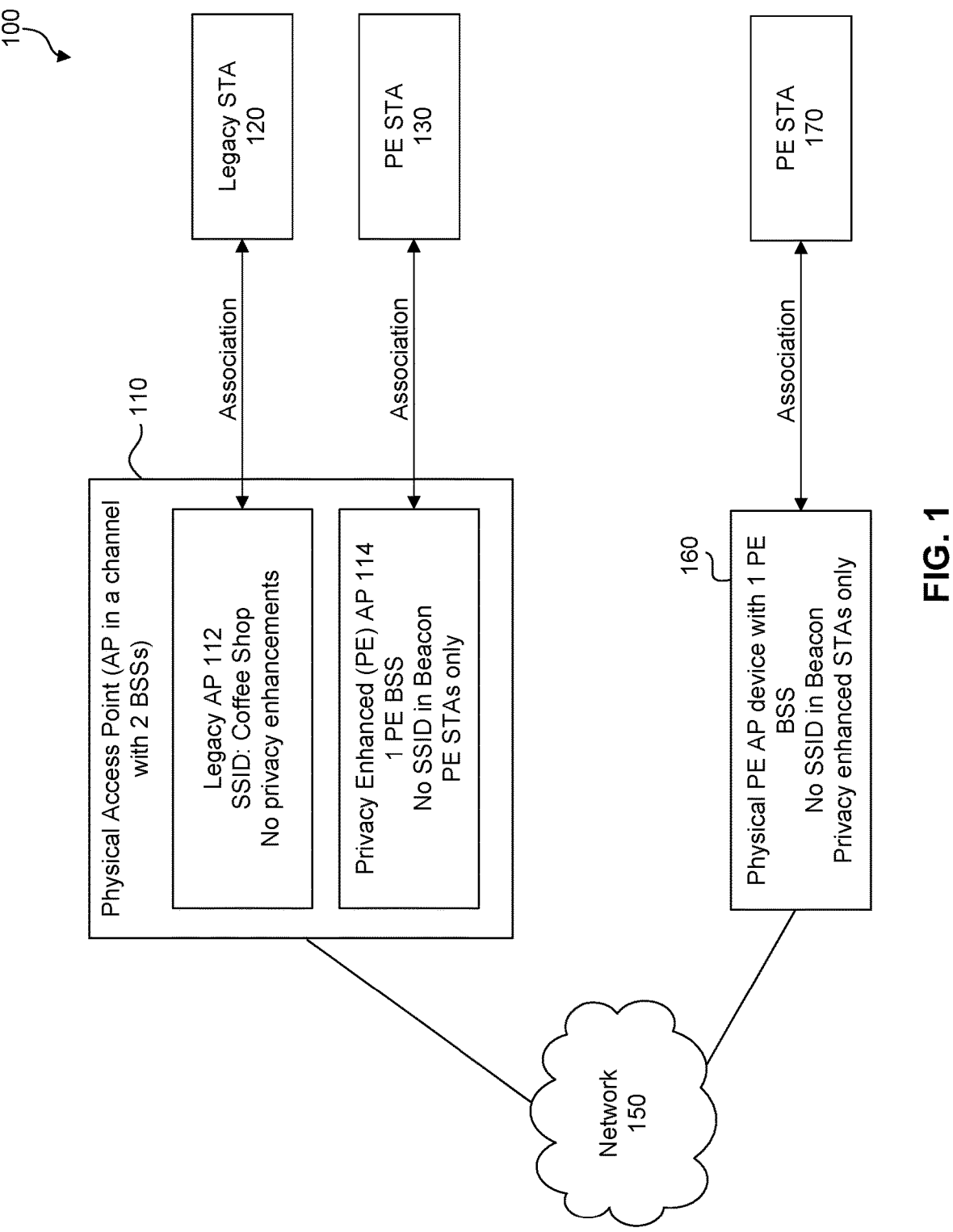
FIG. 1 illustrates an example system supporting privacy enhanced (PE) beacon frames, in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments include a system, apparatus, article of manufacture, method, and/or computer program product and/or combinations and sub-combinations thereof, for privacy enhanced (PE) beacon frames. Some embodiments include a PE beacon frame with a media access control (MAC) header that includes a combination of an extension type field and subtype field of that enables a receiver to determine that the PE beacon frame is an encrypted PE beacon frame or a PE discovery beacon frame. The MAC header of the PE beacon frame can include a random identifier (ID) and a checksum ID that enable a PE station (STA) to identify the corresponding PE access point (AP) that transmitted the PE beacon frame. Some embodiments include fields for an encrypted PE beacon frame as well as a PE discovery beacon frame. Some embodiments include PE beacon transmission-period randomization for encrypted PE beacon frames and unsolicited PE discovery beacon frames.

Privacy in wireless networks (e.g., a basic service set (BSS)) is beneficial for many BSS types including but not limited to: a mobile access point (AP), an AP in a vehicle, a residential private network, a mesh backbone network, an Internet of Things (IOT) network, or a dedicated network (e.g., hospital, company network, hospital, government agency, public safety, etc.) A privacy enhanced (PE) BSS includes privacy enhancements for PE APs and associated PE stations (STAs). A PE BSS is not backward compatible with legacy STAs. Previously authenticated, associated, or preconfigured PE STAs can discover, authenticate, and associate with a PE BSS (e.g., with a PE AP that provides a PE BSS.) Management frames are encrypted and most control frames are obfuscated or encrypted. Physical layer protocol data units (PPDUs) and MAC Protocol Data Units (MPDUs) transmitted in a PE BSS can be optimized to not include personally identifiable information (PII) and/or personally correlated information (PCI). PE BSSs are included in wireless local area network (WLAN) ecosystems.

FIG. 1 illustrates example system 100 supporting PE beacon frames, in accordance with some embodiments of the disclosure. System 100 includes physical AP 110 in a channel with two BSSs: legacy AP 112 and PE AP 114. Legacy AP 112 provides a legacy BSS (e.g., with service set identifier (SSID) called "Coffee Shop") that does not provide any privacy enhancements to associated legacy devices like legacy STA 120. In contrast, PE AP 114 provides a PE BSS (e.g., PE SSID named "PE Coffee Shop") that provides privacy enhancements to PE stations like PE STA 130. System 100 also includes PE AP 160 that can provide a different PE BSS (e.g., PE SSID called "Sarah Knight's car") that provides privacy enhancements to PE stations like PE STA 170. Physical AP 110 and PE AP 160 can access network 150.

Legacy STA 120, PE STA 130, and/or PE STA 170 can be electronic devices that may include but are not limited to a cellular phone, a smart phone, a tablet, a personal digital assistant (PDA), or a laptop. Network 150 may include but is not limited to, any of or any combination of local area networks (LANs), metropolitan area networks (MANs), wireless local area networks (WLANs), and/or the Internet. In some embodiments, PE AP 160 may be a multilink device (MLD), where PE AP MLD 160 may include multiple APs, each AP including a corresponding radio transceiver that operates independently from the other radio transceivers. Each PE AP of PE AP MLD 160 may correspond to a particular different link. For example, a first PE AP can communicate via 2.4 GHz link, a second PE AP can communicate via 5 GHz link, and a third PE AP can communicate via 6 GHz link.

Figure 2:
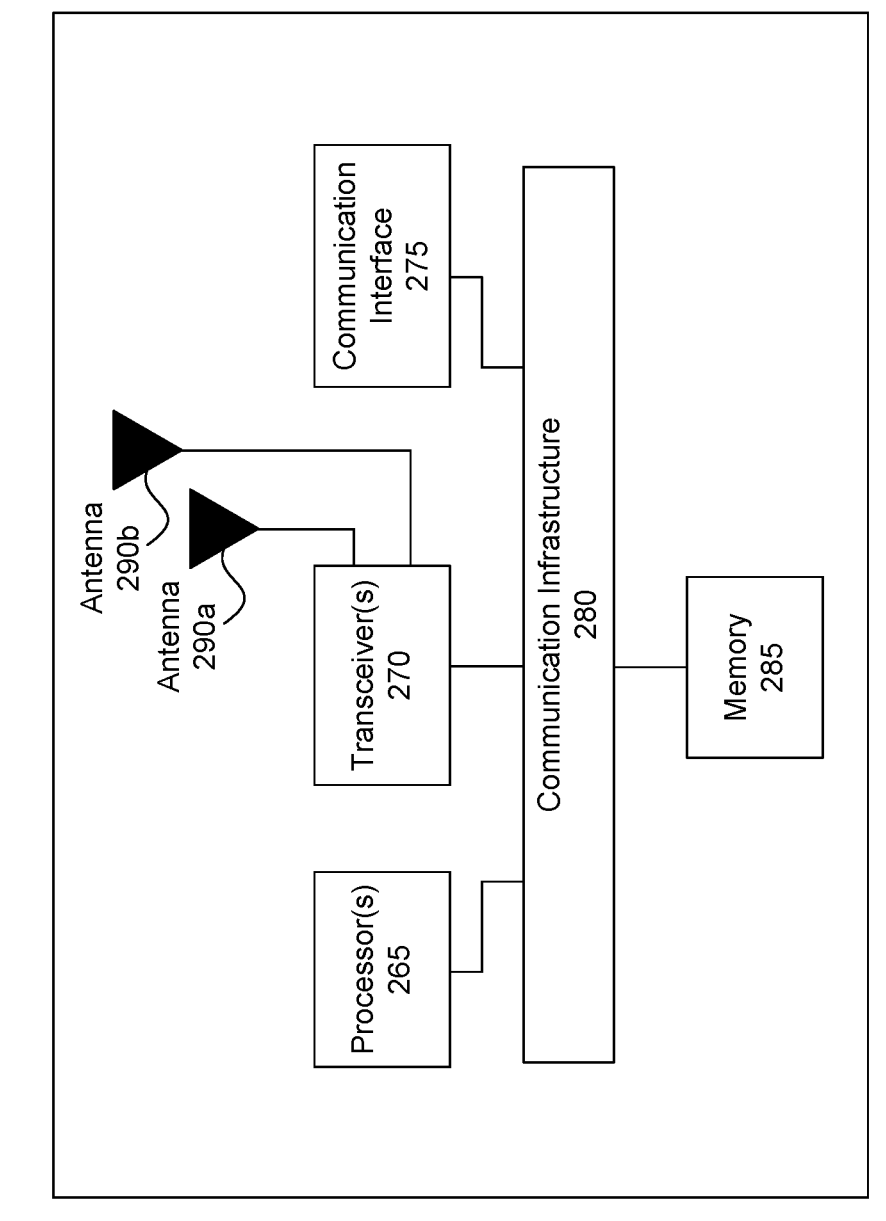
FIG. 2 illustrates a block diagram of an example wireless system supporting PE beacon frames, according to some embodiments of the disclosure.

FIG. 2 illustrates a block diagram of an example wireless system supporting PE beacon frames, according to some embodiments of the disclosure. For explanation purposes and not a limitation, FIG. 2 may be described with reference to elements from FIG. 1. For example, system 200 may be any of the electronic devices: AP 110, PE AP 114, PE AP 160, PE STA 130, and/or PE STA 170 of system 100. System 200 includes one or more processors 265, transceiver(s) 270, communication interface 275, communication infrastructure 280, memory 285, and antenna 290. Memory 285 may include random access memory (RAM) and/or cache, and may include control logic (e.g., computer instructions) and/ or data. One or more processors 265 can execute the instructions stored in memory 285 to perform operations enabling wireless system 200 to transmit and receive wireless communications supporting PE beacon frames described herein. In some embodiments, one or more processors 265 can be "hard coded" to perform the functions herein. Transceiver(s) 270 transmits and receives wireless communications signals including wireless communications supporting PE beacon frames according to some embodiments, and may be coupled to one or more antennas 290 (e.g., 290a, 290b). In some embodiments, a transceiver 270a (not shown) may be coupled to antenna 290a and different transceiver 270b (not shown) can be coupled to antenna 290b. Communication interface 275 allows system 200 to communicate with other devices that may be wired and/or wireless. Communication infrastructure 280 may be a bus. Antenna 290 may include one or more antennas that may be the same or different types.

Figure 5:
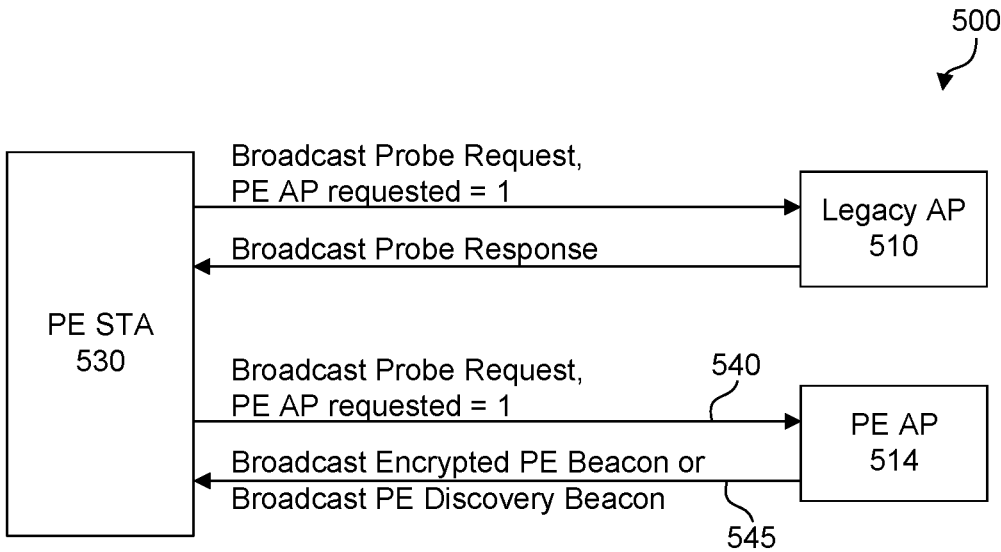
FIG. 5 illustrates examples of broadcast probe/query mechanisms, according to some embodiments of the disclosure.
Figure 5:
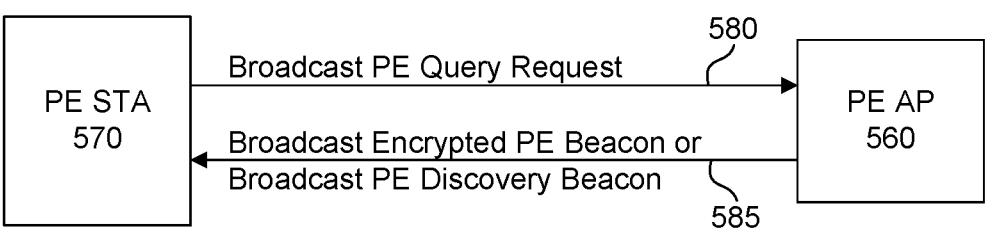

FIG. 5 illustrates example 500 of broadcast probe/query mechanisms, according to some embodiments of the disclosure. For explanation purposes and not a limitation, FIG. 5 may be described with reference to elements from other figures in the disclosure. For example, legacy AP 510, PE AP 514, PE AP 560, PE STA 530, and/or PE STA 570 of system 500 may correspond to legacy AP 112, PE AP 114, PE AP 160, PE STA 130, and/or PE STA 170 of system 100, respectively. PE STA 530 can actively scan for available PE BSSs. For example, a PE STA can transmit a broadcast or directed Probe Request frame to request responses from a legacy AP or a PE AP. As shown in example 500, PE STA 530 can transmit broadcast probe request 540 to PE AP 514. In response, PE AP 514 can respond with a broadcast PE beacon frame 545 that can be an encrypted PE beacon frame or a PE discovery beacon frame. If the broadcast PE beacon frame 545 includes PE BSS information of multiple PE BSSs, then broadcast PE beacon frame 545 is a PE discovery beacon frame.

A PE STA can transmit a broadcast or directed PE Query Request frame to request responses from PE APs that provide PE BSSs. If a unicast PE Query Request is addressed to an associated PE AP (and corresponding PE BSS) the unicast PE Query Request is encrypted. A broadcast PE Query Request is transmitted unencrypted. For example, PE STA 570 can transmit broadcast PE Query request 580 unencrypted to PE AP 560. In response, PE AP 560 can respond with broadcast PE beacon frame 585 that can be an encrypted PE beacon frame or a PE discovery beacon frame. When broadcast PE beacon frame 585 is a PE discovery beacon frame, broadcast PE beacon frame 585 includes PE BSS information of multiple PE BSSs corresponding to PE AP 560. In some embodiments an extension type and subtype value in a frame control field of a MAC header of broadcast PE beacon frame 545 or 585 can enable a PE STA to detect an encrypted PE beacon frame or a PE discovery beacon frame.

Figures 3A, 3B:
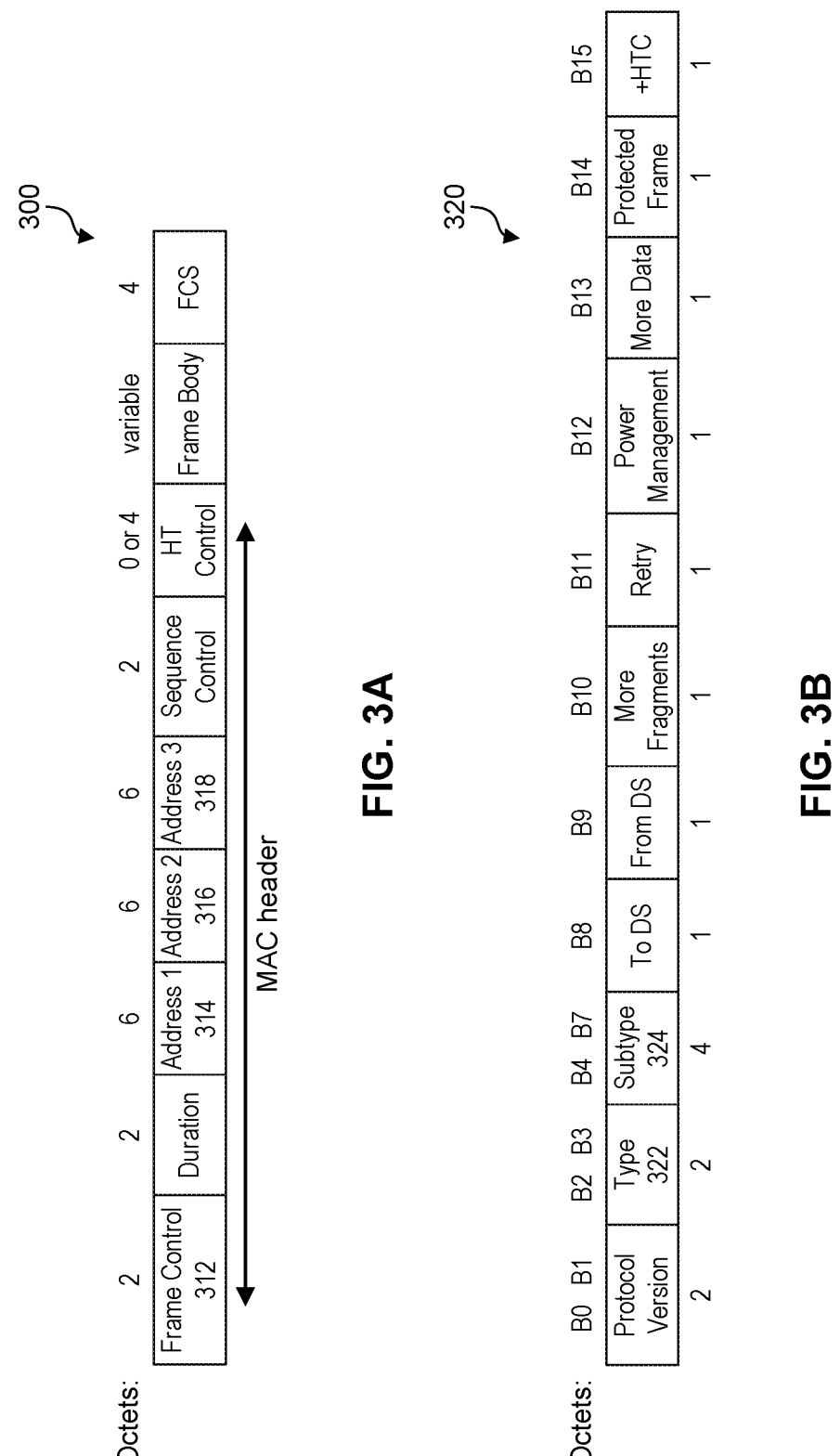

FIGS. 3A-3C illustrate example fields for PE beacon frame type detection, according to some embodiments of the disclosure. For explanation purposes and not a limitation, FIGS. 3A-3C may be described with reference to elements from other figures in the disclosure.

For example, a type and subtype combination at row 360 of FIG. 3C can be included in MAC header 700 of FIG. 7A, MAC header 910 of FIG. 9A, and MAC header 935 of FIG. 9B below. Example 300 shows a management frame format that includes a MAC header, a frame body, and a frame check sequence field. Fields within the MAC header are not encrypted, and can include but are not limited to the following fields: frame control 312, address 1 314, address 2 316, and address 3 318. Frame control 312 is shown in more detail in example 320 of FIG. 3B. Example 320 can include but is not limited to type 322 and subtype 324. Example values of type 322 and subtype 324 are shown in example 350 of FIG. 3C. Type 322 is used to detect whether the frame is a data, control, or management frame. Subtype 324 defines more fine grained content of the MPDU.

Some embodiments utilize a combination of type 322 and subtype 324 values to modify the structure of a MAC header to enable a PE STA to detect and determine a type of PE beacon frame. For example, when a PE beacon frame is received (e.g., an encrypted PE beacon frame in example 700 of FIG. 7A or a PE discovery beacon frame in example 930 of FIG. 9B), a receiver (e.g., PE STA) can determine based on a combination of type 322 and subtype 324 values in the respective MAC header fields, whether the receiver can decrypt the PE beacon frame. In some embodiments, type and subtype values shown as row 360 of example 350 of FIG. 3C may be used to detect and determine a PE beacon frame type. As an example, when type 322='11' and subtype 324='0010' the PE beacon frame can be identified as an encrypted PE beacon frame. In another example, when type 322='11' and subtype 324='0011' the PE beacon frame can be identified as a PE discovery beacon frame. The combinations of type 322 and subtype 324 corresponding to PE beacon frames, can affect the following fields of example 300: address 1 314, address 2 316, and address 3 318 as shown in Table 1 below.

TABLE 1

| MAC Header Address Rule | | | | |
| --- | --- | --- | --- | --- |
| Address Field | Rule for Address | Legacy Beacon Addresses | PE Beacon Addresses | Other PE Group Frames |
| Address 1 314 | Receiver Address (RA) (=Destination Address (DA)) | Broadcast address | Broadcast address | Group/Broadcast address + offset |
| Address 2 316 | Transmitter Address (TA) (=Source Address (SA)) | Basic service set identifier (BSSID) | Random ID | AP Over the Air (OTA) address for group frames |

TABLE 1-continued

| | | MAC Header Address Rule | | |
|---|---|---|---|---|
| Address Field | Rule for Address | Legacy Beacon Addresses | PE Beacon Addresses | Other PE Group Frames |
| Address 3 318 | BSSID | BSSID | Checksum ID | AP address OTA for group frames |

Figures 7A, 7B:
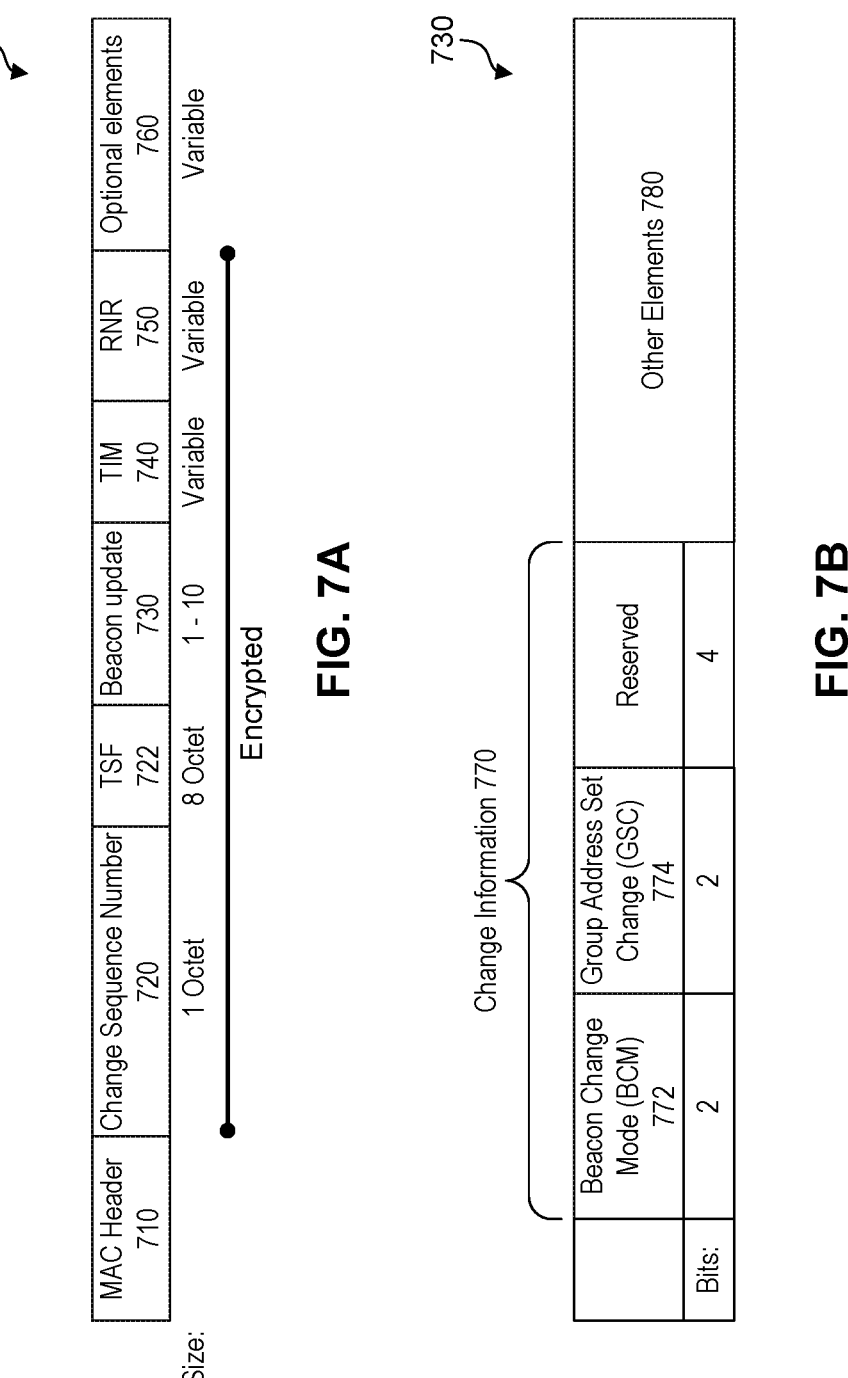
FIG. 7A illustrates an example of an encrypted PE beacon frame format, according to some embodiments of the disclosure.
FIG. 7B illustrates example fields of a beacon update field, according to some embodiments of the disclosure.
Figures 9A, 9B:
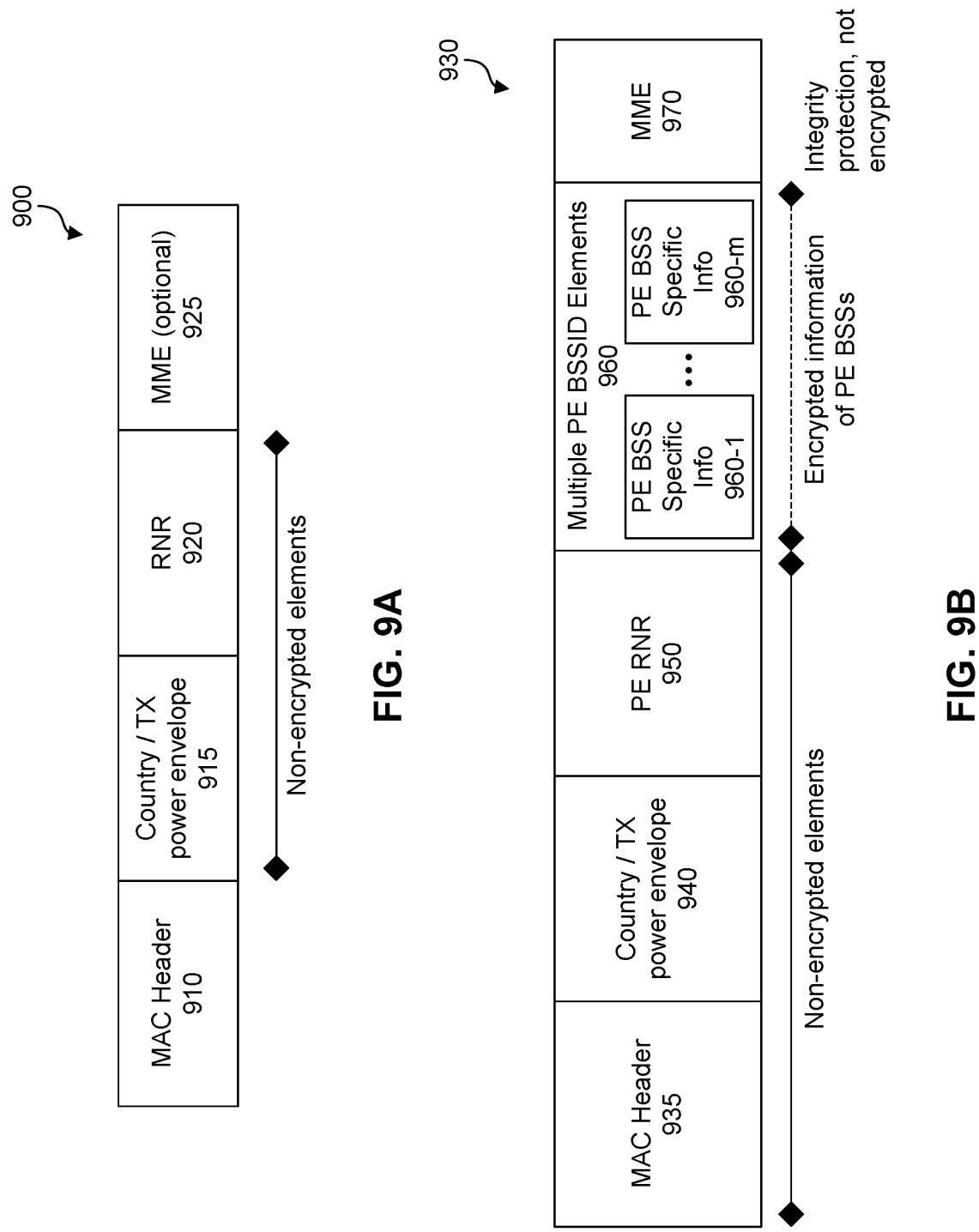
FIG. 9A illustrates an example of a discovery beacon frame, according to some embodiments of the disclosure.
FIG. 9B illustrates an example of a PE discovery beacon frame format with PE BSS information, according to some embodiments of the disclosure.

As shown in Table 1, when MAC Header 710 in example 700 of FIG. 7A includes a combination of type 322 and subtype 324 corresponding to an encrypted PE beacon frame, or when a MAC Header 935 in example 930 of FIG. 9B includes a combination of type 322 and subtype 324 corresponding to a PE discovery beacon frame, address 2 316 and address 3 318 can include corresponding random ID and checksum ID values. In some embodiments, MAC Header 910 in example 900 of FIG. 9A includes a combination of type 322 and subtype 324 corresponding to a discovery beacon frame, and address 2 316 and address 3 318 can include corresponding random ID and checksum ID values. In other words, the address fields in MAC header 710, MAC header 935, and/or MAC header 910 of respective PE beacon frame formats and discovery beacon format can include a corresponding random ID and checksum ID. In some embodiments address 1 314 includes a broadcast address and each of the address fields (address 1 314, address 2 316 and address 3 318) are 6 octets in length.

The PE AP changes both the random ID and the checksum ID periodically to protect the identity of the PE AP. In some embodiments, the random ID and checksum ID may be additional fields added to the MAC header in example 300 before the frame body field. In some embodiments, the length of the random ID and checksum ID fields can vary.

Figure 4A:
FIGS. 4A-4B illustrate example implementations for random identifiers (IDs) and checksum IDs, according to some embodiments of the disclosure.
Figure 4B:

FIGS. 4A-4B illustrate examples 400 and 450 of implementations for random IDs and checksum IDs, according to some embodiments of the disclosure. For explanation purposes and not a limitation, FIGS. 4A-4B may be described with reference to elements from other figures in the disclosure. For example, A1 414, A2, and A3 418 of FIGS. 4A-4B may correspond to address fields address 1 314, address 2 316, and address 3 318 of FIG. 3A. Examples 400 and 450 illustrate how the three address fields can support random IDs and checksum IDs that are larger than 6 octets. For example, example 400 includes a 9 octet random ID 440 and 9 octet checksum ID 445. Thus, A1 414 and A2 436 (e.g., the first 3 octets of A2) fields may be used to carry random ID 440. A2 438 (the last 3 octets of A2) combined with A3 418 may be used to carry checksum ID 445. Example 450 illustrates how the three address fields can be divided to support 8 octet random ID 470 and 8 octet checksum ID 475. For example, A1 414 and A2 462 (e.g., the first 2 octets of A2) fields may be used to carry random ID 470. A2 468 (the last 2 octets of A2) combined with A3 418 may be used to carry checksum ID 475. The A2 464 (the middle remaining 2 octets of A2) may be a reserved field, reserved 472.

Returning to the last column of Table 1, PE group frames may be transmitted by a PE AP. The MAC headers of PE beacon frames are different from other group frames transmitted by a PE AP. For example, a PE AP can configure group address set(s): transmitter Over the Air (OTA) MAC address and offsets for a Group address sequence number (SN) and/or packet number (PN).

Figure 6:
FIG. 6 illustrates an example of PE access point (AP) identification from a PE beacon frame, according to some embodiments of the disclosure.

FIG. 6 illustrates example 600 of PE AP identification from a PE beacon frame, according to some embodiments of the disclosure. For explanation purposes and not a limitation, FIG. 6 may be described with reference to elements from other figures in the disclosure. For example, PE AP MLD 610, PE AP 611, PE AP 612, PE AP 613, and/or PE STA 620 may be a system 200 of FIG. 2. PE AP MLD 610 includes an identifier, AP MLD ID 605, and PE AP MLD 610 includes 3 affiliated PE APs 611, 612, and 613. Each affiliated PE AP (e.g., PE AP 611, PE AP 612, and PE AP 613) in PE AP MLD 610 selects a different random ID value (e.g., random ID 1 is different than random ID 2 and random ID 3). PE STA 620 may not be a MLD. PE STA 620 can be configured with identifier, AP MLD ID 605, for PE AP MLD 610.

PE STA 620 that is configured with the identifier, AP MLD ID 605, for PE AP MLD 610 can discover PE AP MLD 610 from any PE beacon frame transmitted by an affiliated PE AP (e.g., PE AP 611, PE AP 612, and PE AP 613). Other PE STAs that do not know AP MLD ID 605 (e.g., are not provisioned with AP MLD ID 605) will expect that PE AP 611, PE AP 612, and/or PE AP 613 are not related to each other (e.g., not affiliated with AP MLD 605). PE STA 620 can select AP MLD ID 605, and can receive a PE beacon frame from any affiliated PE AP (e.g., PE AP 611, PE AP 612, and PE AP 613). PE STA 620 can use the received random ID (e.g., random ID 2 from PE AP 612) and AP MLD ID 605 to calculate a checksum ID. PE STA 620 can compare the calculated checksum value with checksum ID 2 received in the PE beacon frame. If the calculated checksum value substantially matches checksum ID2, PE STA 620 can verify the identity of PE AP 612. In other words, PE STA 620 determines that PE AP 612 affiliated with AP MLD 610 has been discovered. In some embodiments the checksum used in the comparison is a previously stored value.

In some embodiments, for an 8 octet random ID, the calculated checksum value can be determined using a Hash Message Authentication Code (HMAC)-SHA and Address Resolution Key (ARK) functions shown below:

$$\text{Determined Checksum ID=Truncate-64(HMAC-SHA-256(ARK, "AP MLD ID", Random ID))},$$

where

AP MLD ID is a 128 bit identifier of PE AP MLD 610, random ID is a 64 bit random ID 2 of PE AP 612, and determined Checksum value is a 64 bit Checksum ID 2 of PE AP 612.

In some embodiments, a PE STA stores information for PE APs and corresponding PE BSSs. A PE STA stores many PE AP parameters as shown in Table 2.

TABLE 2

| Information Stored by a PE STA | |
|---|---|
| Type of Stored Information | Stored Parameters in a non-AP PE STA |
| Parameters stored for PE BSS | PE AP authentication address/ID STA authentication address/ID |

TABLE 2-continued

Information Stored by a PE STA

| Type of Stored Information | Stored Parameters in a non-AP PE STA |
|---|---|
| Stored encryption keys for PE BSS | SSID<br>Authentication key<br>Authentication mode<br>Optional encrypted PMKID<br>BIGTK key1 for PE Beacon and Multiple BSSID Beacon content decryption<br>BIGTK key2 for Discovery Beacon Integrity checksum<br>PE AP Address Resolution Key (ARK) |

Based on the stored information in Table 2, a PE STA may select to authenticate with the PE BSS. In some embodiments, the STA may select to continue to setup pre-association security to obtain more information on the PE AP. In some embodiments, the PE AP ARK is used to detect the identification of the PE AP (e.g., this key is long term AP key that may be used in AP MLD ID calculation.) The BIGTK key1 may be short term key to protect the payload of the Beacon frame. The BIGTK key2 may be long term key to calculate integrity check sum for a PE discovery beacon (e.g., a PE discovery beacon MME calculation.) In some embodiments a salt for target PE beacon transmission time (TPBTT) may be stored by a PE STA (see FIG. 11B.)

PE beacon frames may have a separate sequence number (SN) and/or packet number (PN) counter that are increased when a PE AP transmits a PE beacon frame. The PN and SN can be used for PE beacon payload encryption. Examples for PE beacon frame protection are shown below in Table 3:

TABLE 3

PE Beacon Frame Encryption Key

| Group Frame | Alternative 1) Group Temporal Key (GTK) Only | Alternative 2) Long Term Beacon Key |
|---|---|---|
| Beacon data | Beacon Integrity GTK (BIGTK) | Long term Beacon key, over multiple associations. |
| Group addressed data | GTK | GTK |
| Receiver operation | Scanning PE STAs need to create BIGTK to receive PE beacon content | PE beacon content may be received by scanning devices |
| Comparison | PE AP can change Beacon encryption easily | AP can not change Beacon encryption easily |
| Comment | If the GTK has not been changed, the PE STA may still receive the PE beacon | Scanning PE STA may check whether the Beacon Parameter Change Cont (BPCC) is still the same and PE STA knows the PE BSS parameters |

FIG. 7A illustrates example 700 of an encrypted PE beacon frame format, according to some embodiments of the disclosure. For explanation purposes and not a limitation, FIG. 7A may be described with reference to elements from other figures in the disclosure. For example, example 700 may be included in broadcast PE beacon frame 545 transmitted from PE AP 514 and/or broadcast PE beacon frame 585 transmitted by PE AP 560 of FIG. 5. PE beacons contain minimal information to maintain associations. The encrypted PE beacon frame format of example 700 can include MAC header 710, change sequence number 720, timing synchronization function (TSF) 722, beacon update 730, traffic indication map (TIM) 740, reduced neighbor report (RNR) 750 and optional elements 760. Note that the following fields are transmitted encrypted: change sequence number 720, TSF 722, beacon update 730, TIM 740, and/or RNR 750.

The fields of the encrypted PE beacon frame format of example 700 are shown below in Table 1.

TABLE 4

Example Encrypted PE Beacon Frame Elements

| Element | Purpose |
|---|---|
| MAC Header 710 | Includes Transmitter Address (TA), PE AP MAC address; used to detect the transmitter of the encrypted PE beacon frame |
| Change Sequence Number 720 (early termination) | If value changes, then one or more AP parameter values is changed and the PE STA should receive the entire encrypted PE beacon frame; if the value does not change, the reception of the encrypted PE beacon frame can be terminated early (e.g., before receiving the entirety of the encrypted PE beacon frame) |
| Timing synchronization function (TSF) 722 | Synchronization maintenance with AP |
| Beacon update 730 | Signals upcoming beacon reception address changes (see FIG. 7B) |
| Traffic indication map (TIM) 740 | Indicates whether AP has buffered unicast or groupcast frames for the PE STA |
| RNR 750 | Needed to maintain PE AP MLD links with other affiliated PE APs |
| Optional elements 760 | The elements whose value change has updated the Change Sequence Number 720 may be included in example 700. The associated devices need to obtain the new values of these elements in order to operate correctly with the PE AP. For instance, the PE AP may update the support for some transmission rates and associated PE STAs need to know which transmission rates the PE AP is receiving. |

In some embodiments, change sequence number 720 is located adjacent to and processed subsequent to MAC header 710 being processed. Change sequence number 720 signals to a PE STA whether any PE BSS parameters of a PE BSS provided by a PE AP (e.g., PE AP 514 or PE AP 560) have changed or will change in the future. For example, a value of change sequence number 720 can be increased (e.g., by +1) if a BSS parameter has changed or will change. Thus, a PE STA (e.g., PE STA 530 or PE STA 570) that receives the encrypted PE beacon frame of example 700 and decrypts change sequence number 720, can determine whether any BSS parameters of the corresponding PE BSS have changed or will change. If for example, no BSS parameters have changed, then if the PE STA is not interested in any buffered downlink (DL) packets, the PE STA can terminate further reception of the encrypted PE beacon frame of example 700. This early termination of the encrypted PE beacon frame can save PE STA resources (e.g., battery power) and the PE STA can for example, return to a sleep or doze state.

FIGS. 8A-8F illustrate examples of encrypted reduced neighbor report (RNR) element fields in an encrypted PE beacon format, according to some embodiments of the disclosure. For explanation purposes and not a limitation, FIGS. 8A-8F may be described with reference to elements from other figures in the disclosure. For example, RNR element 850 of FIG. 8A may correspond to RNR 750 of FIG. 7A. For example, RNR element 850 can include content for affiliated PE APs of a PE AP MLD, and encrypted portions of multiple BSSID (MBSSID) PE information.

Figures 8A, 8B, 8C:
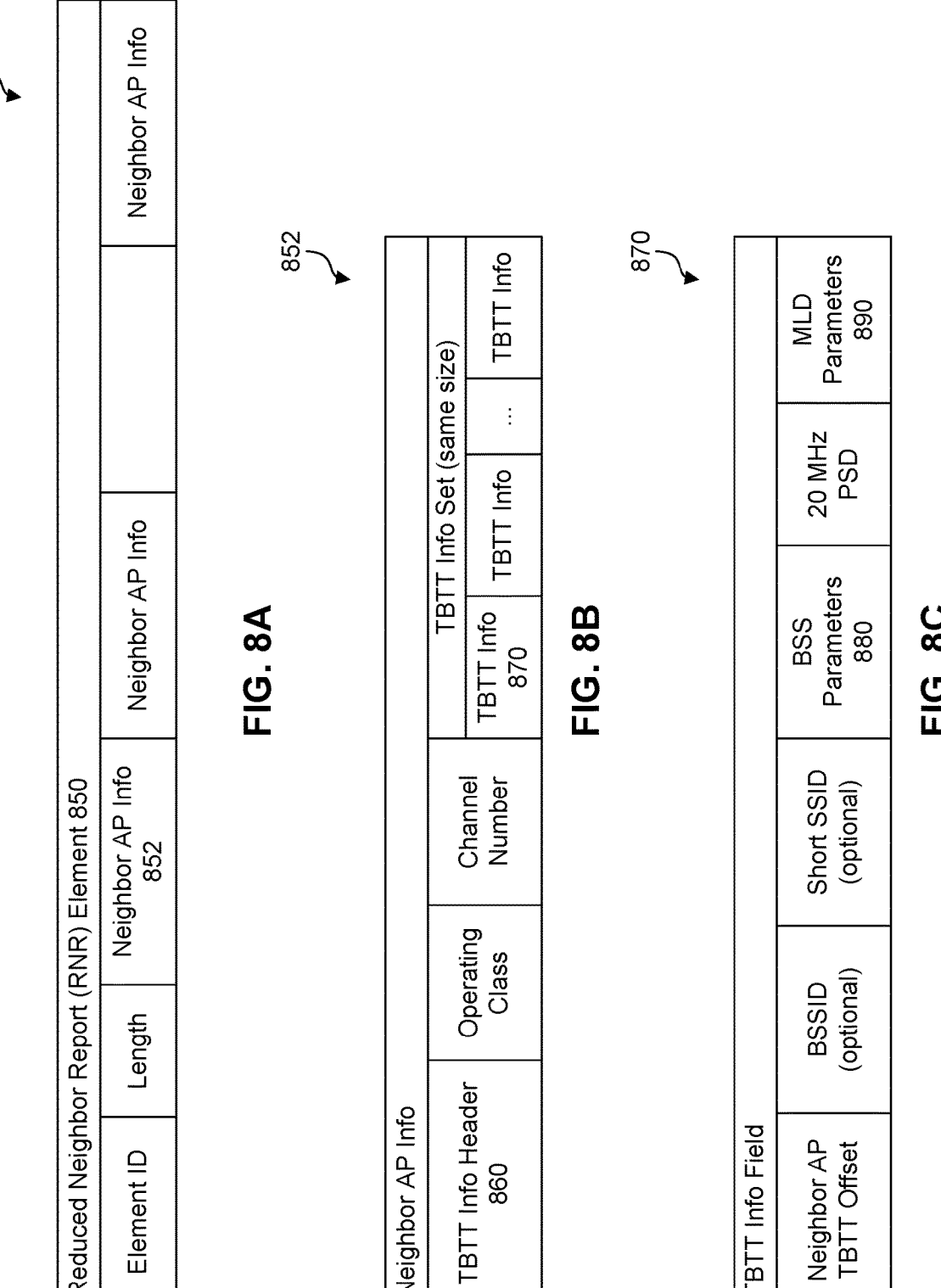
FIGS. 8A-8F illustrate examples of reduced neighbor report (RNR) element fields in an encrypted PE beacon, according to some embodiments of the disclosure.
Figures 8D, 8E, 8F:
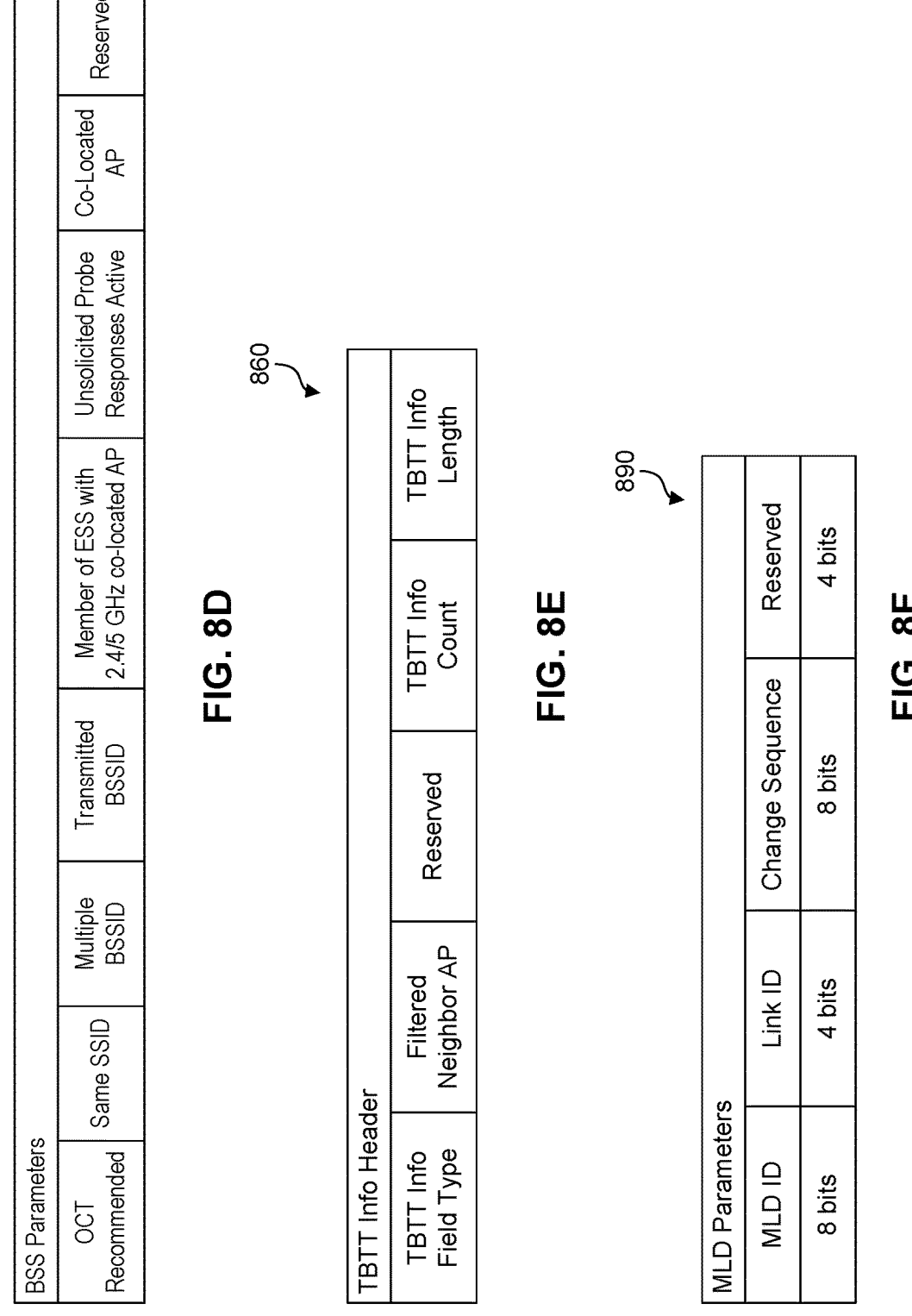

Example 800 of FIG. 8A includes RNR element 850 that includes one or more neighbor AP information fields (e.g., neighbor AP info 852.) Since RNR element 850 is encrypted transmitted, RNR element 850 may utilize the legacy RNR format in the encrypted PE beacon frame format. Accordingly, neighbor AP info 852 includes target beacon transmission time (TBTT) info header 860 as well as TBTT info 870. TBTT info 870 field includes BSS parameters 880 and MLD parameters 890. Assume for example, a PE AP MLD includes 3 affiliated PE APs and the first PE AP transmitted the encrypted PE beacon frame of example 700. The MLD ID field can be generated by the reporting first PE AP to identify the list of reported PE APs affiliated to the same PE AP MLD. The Link ID field indicates the link identifier of the reporting first PE AP within the PE AP MLD to which the reporting first PE AP is affiliated (e.g., the first PE AP of the PE AP MLD).

FIG. 7B illustrates an example of beacon update 730, according to some embodiments of the disclosure. For explanation purposes and not a limitation, FIG. 7B may be described with reference to elements from other figures in the disclosure. For example, beacon update 730 is included in encrypted PE beacon frame example 700 of FIG. 7A. Some embodiments enable a PE AP to use beacon update 730 to inform an associated PE STA that changes to one or more PE BSS parameters are forthcoming, when the changes are coming, and any corresponding new values. Thus, an associated PE STA can timely adjust stored information to receive PE beacon frames with the updated information, and thus maintain the association with the PE AP.

For example, when change sequence number 720 of FIG. 7A indicates that a BSS parameter has changed or will change, the changes are indicated in beacon update 730. As shown in FIG. 7B, beacon update 730 can include change information 770 and other elements 780. Change information 770 can include beacon change mode (BCM) 772 and group address set change (GSC) 774 as shown below in Table 5 and Table 6, respectively.

TABLE 5

| Beacon Change Mode (BCM) | |
| --- | --- |
| Beacon Change Mode (BCM) Value | Purpose |
| 0 | No change |
| 1 | Associated PE AP address change |
| 2 | PE beacon transmit address and associated PE AP address change |
| 3 | Timing synchronization function (TSF), PE beacon transmit address and associated PE AP address change |

TABLE 6

| Group Address Set Change (GSC) | |
| --- | --- |
| Group Address Set Change (GSC) Value | Purpose |
| 0 | No change, no new profiles |
| 1 | New profiles added |
| 2-3 | Reserved |

The values of BCM and/or GSC affect the information that is included in other elements 780 as shown in Table 7.

TABLE 7

| Information Beacon Reception Parameters of Beacon Update | | |
| --- | --- | --- |
| Element | When present | Purpose |
| Change Information 770 (1 octet) | Always | Defines the type of the coming (e.g., impending) PE beacon and group address mode change |
| TBTTs until PE beacon address change | BCM ≥ 1 | Number of TBTTs until PE beacon addresses change. Value 0 means that the PE beacon address change after the received PE beacon |
| Random ID of associated PE AP | BCM ≥ 1 | The random ID used by the associated PE AP after the address change |
| Beacon transmit random ID | BCM ≥ 2 | If the PE BSS beacon is transmitted as part of the Multiple PE BSS Beacons, the new random ID of the transmitting PE AP |
| TSF after change | BCM = 3 | TSF value that will be adopted after PE beacon transmission on TBTT for the address change |

TABLE 7-continued

Information Beacon Reception Parameters of Beacon Update

| Element | When present | Purpose |
|---------|-------------|---------|
| Group Address Set After Change | GSC = 1 | The new group frames transmission parameters. Used for all Group frames, except encryption PE beacon and PE discovery beacon |
| TBTTs until Group address set change | GSC = 1 | The number of TBTTs until group address set will be changed |

FIG. 9A illustrates example 900 of a discovery beacon, according to some embodiments of the disclosure. Example 900 can include MAC header 910, country/transmission power envelope 915, reduced neighbor report (RNR) 920, and Management Message Integrity Check (MIC) Element (MME) 925. An AP (e.g., AP 110 or a PE AP) can send a discovery beacon to advertise PE BSSs. As described above, in some embodiments, MAC header 910 can include an extension type (e.g., 11) and a subtype (e.g., 0011) that enables a PE STA to identify the discovery beacon (e.g., using random ID and checksum ID). The fields of example 900 are described below in Table 8. In some embodiments, STAs may ignore MME 925, if they do not have Beacon Integrity Group Transient Key (BIGTK) set with the transmitting AP. MME 925 is a hash check sum that may be used to detect integrity of the discovery beacon. If the MME calculated from the PE beacon frame content matches with the MME transmitted in the PE beacon frame, then the receiver knows that non-encrypted parts of the PE beacon frame has not been changed by an attacker.

TABLE 8

Example information in a Discovery Beacon

| Element | Purpose |
|---------|---------|
| MAC Header 910 | The MAC Headers make the transmitting AP discoverable |
| Country/ Transmission power envelope 915 | The elements required to calculate regulatory maximum transmission power. The element is optionally present |
| Reduced Neighbor Report (RNR) 920 | Detect the AP9(s) to which the discovery frame is sent and other suitable APs in proximity. Provides out-of-band information for PE BSSs |
| Management MIC element (MME) 925 | Integrity check sum of the discovery beacon frame content |

FIG. 9B illustrates example 930 of a PE discovery beacon frame format with PE BSS information of multiple PE BSSs, according to some embodiments of the disclosure. For explanation purposes and not a limitation, FIG. 9B may be described with reference to elements from other figures in the disclosure. For example, PE discovery beacon frame format of example 930 may correspond to broadcast PE beacon frame 545 or broadcast PE beacon frame 585 of FIG. 5. A problem with example 900 of FIG. 9A is that if RNR 920 includes two or more PE BSSs, an attacker may be able to track the discover beacon transmitter since RNR 920 is transmitted non-encrypted. In the encrypted PE beacon frame of example 700, RNR 750 is encrypted when transmitted via a single PE BSS. Encrypted PE beacon frame tracking is complicated, because only MAC header 710 is not protected (e.g., not encrypted) and the relevant field values, like the random ID and checksum ID may be changed. Also the PE AP may change TSF more easily with single PE BSS.

PE discovery beacon frame of example 930 can include MAC header 935, country/TX power envelope 940, PE RNR 950, multiple PE BSSID elements 960, and MME 970. Country/TX power envelope 940 and MME 970 may correspond to country/TX power envelope 915 and MME 925 of FIG. 9A. In some embodiments, integrity protection may have a separate key, for instance BIGTK Key 2, that is provided to associated PE STAs. If the integrity key is not known, the PE STAs ignore MME 970.

As described above, MAC header 935 may include a type and subtype that allows a PE STA to determine that a PE beacon frame is a PE discovery beacon frame. In addition, MAC header 935 may include a corresponding random ID and checksum ID to allow a receiver (e.g., a PE STA) to discover the PE AP transmitting a PE discovery beacon frame of example 930.

In some embodiments, PE RNR 950 is a non-encrypted element that can include information for legacy BSSs and PE BSSs in the same channel or other channels, as well as corresponding sizes for PE BSS Specific Info subelements (e.g., for each PE BSS, a corresponding size of PE BSS specific info 960-1 through 960-m are included in the order in which the TBTT Info 1030 is included in the RNR element).

Figures 10A, 10B:
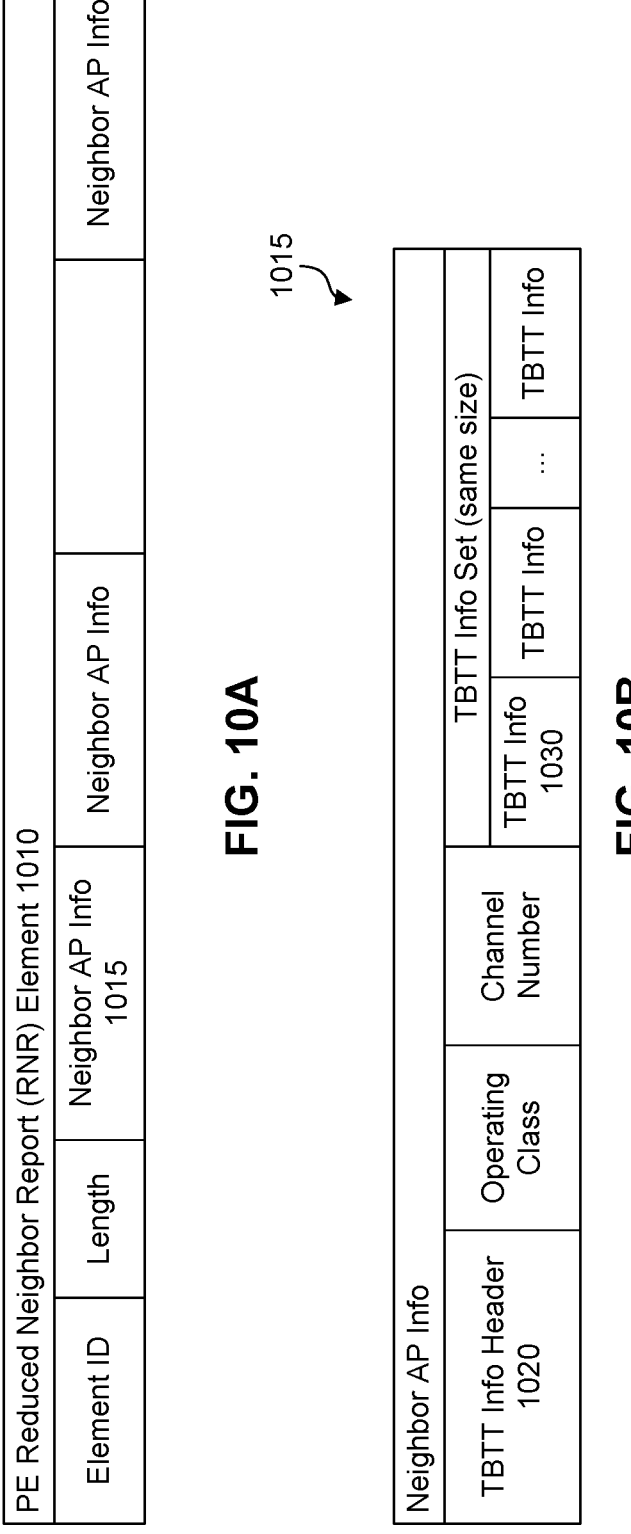

FIGS. 10A-10D illustrate examples of PE RNR 1010 element fields of a PE discovery beacon that are not encrypted, according to some embodiments of the disclosure. For explanation purposes and not a limitation, FIGS. 10A-10D may be described with reference to elements from other figures in the disclosure. For example, PE RNR element 1010 of FIG. 10A can be the same as PE RNR 950 of FIG. 9B. PE RNR element 1010 can include neighbor legacy AP information and neighbor PE AP information where the neighbor legacy AP and neighbor PE AP are in the same channel. In example 1000, neighbor AP info 1015 corresponds to a neighbor PE AP. Neighbor AP info 1015 can include TBTT info header 1020 and TBTT info 1030. TBTT info header 1020 is shown in FIG. 10C. In some embodiments, TBTT info 1030 of FIG. 10D includes random ID 1032, checksum ID 1034, and PE MBSSID size 1036. Random ID 1032 and checksum ID 1034 can be of a size (e.g., 6-9 octets) as described above in Table 1 Table 1 and regarding FIGS. 4A and 4B. PE MBSSID size 1036 describes a size of a corresponding PE BSS specific info (e.g., PE BSS specific info 960-1) of FIG. 9B. A PE STA that receives PE RNR 950 that is non-encrypted in transmission can use random ID 1032 and checksum ID 1034 to discover a corresponding neighboring PE AP (of the PE AP transmitting the PE discovery beacon of example 930) as described above. Further, the PE STA can use PE MBSSID size 1036 to obtain encrypted information specific to the PE BSS corresponding to the neighbor AP info 1015.

Returning to FIG. 9B, the encrypted information of a PE BSS Specific Info 960 of example 930 are described below in Table 9.

TABLE 9

| PE BSS Specific Information for PE Discovery Beacon Frame | |
| --- | --- |
| Element | Purpose |
| MAC Header | Transmitter Address (TA), AP MAC address, to detect the transmitter of the frame |
| Change Sequence Number (early termination) | If value changes, then one or more PE AP parameter values is changed and PE STA should receive the whole PE discovery beacon |
| Beacon Update | Signal coming beacon reception address change |
| Traffic indication map (TIM) | Indication whether AP has has buffered unicast or groupcast frames for the STA |
| Reduced Neighbor Report (RNR) | Needed to maintain PE AP MLD links with other affiliated PE APs |
| Optional elements | The critically updated elements may be included to the PE discovery beacon. This avoids probe responses |

In some embodiments, the beacon update elements as shown in Table 7 can include elements of beacon update 730 (e.g., a beacon update control field) of FIG. 7B, also shown in Table 5 and Table 6. The beacon update elements provide information of the possible changes in the PE beacon frame content or transmission timing. The respective elements are targeted for PE STAs to be able to receive PE beacons with minimum power consumption, (e.g., the receivers may minimize the channel listening and calculations in PE beacon reception.)

Figures 11A, 11B:
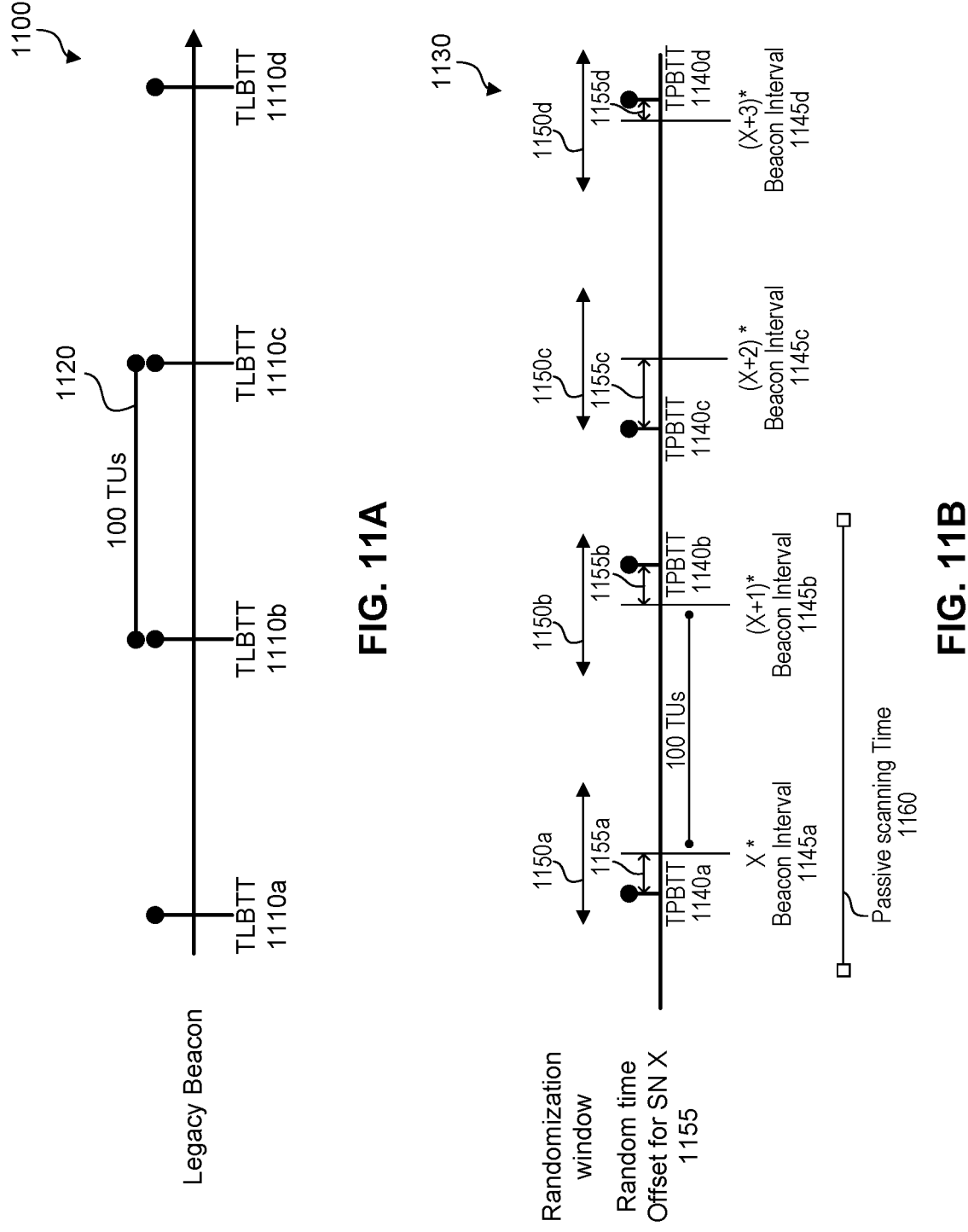
FIG. 11A illustrates an example of a legacy beacon, according to some embodiments of the disclosure.
FIG. 11B illustrates an example of randomization of PE beacon transmission periodicity, according to some embodiments of the disclosure.

FIG. 11A illustrates example 1100 of a legacy beacon, according to some embodiments of the disclosure. An AP can transmit a legacy beacon at target legacy beacon transmission times (TLBTTs) 1110a, 1110b, 1110c, and 1110d. The TLBTT can equal a sequence number (SN)*a beacon interval, where beacon interval 1120 can equal 100 time units (TUs) (e.g., 102.4 ms).

Associated STAs receive beacon frames to maintain AP operating parameters and detect availability of buffered DL frames from the beacon frame. Passive scanning is based on the fixed beacon duration. A passively scanning STA selects the duration for the channel and listens to ensure at least one beacon frame transmission is received during the listening interval, e.g., approximately 110 ms scanning time at a channel. Some passive scanning enhancements transmit a frame (unsolicited probe responses) more frequently to make a BSS more easily discoverable and to reduce active scanning. An attacker may use fixed beacon transmission interval to track the AP. Some embodiments provide privacy enhancement by using a random beacon transmission interval to make PE AP tracking more challenging and complex.

FIG. 11B illustrates example 1130 of randomization of PE beacon transmission periodicity, according to some embodiments of the disclosure. Some embodiments include determining target PE beacon transmission times (TPBTTs) 1140a-1140d based on beacon intervals (e.g., beacon intervals 1145a-1145d) plus a corresponding random time offset 1155 for SN X (e.g., corresponding random time offsets 1155a-1155d). Time intervals can be settable and can include a default value (e.g., every 100 TUs.) A size of a PE beacon randomization window (e.g., 1150a-1150d) can be configured as well and can be set to a default (e.g., 50 TUs, or 20% of a beacon transmission interval (e.g., 20% of 100 TUs.))

In some embodiments, a TPBTT can be determined as follows:

TPBTT=SN*Beacon interval+Max Random
time*Random TimeOffsetHASH(SN, salt), where Random TimeOffsetHASH has a value [−0.5,+0.5]

The salt can be stored by a PE STA. Each associated STA can calculate the Random offset 1155 and determine the next TPBTT. The actual beacon transmission time may be delayed if the channel is busy during TPBTT. PE AP beacon randomization embodiments do not make changes to TSF.

As shown in example 1130, the randomization added to PE beacon transmissions make TPBTTs 1140a-1140d harder for an attacker to track compared to the TLBTTs 1110a-1100d of example 1100. Assuming a default PE beacon transmission interval of 100 TUs, and a default PE beacon randomization window of 50 TUs, passive scanning time 1160 for receiving a PE beacon in a channel may be: 110 ms+ Max Random time=160 ms. The listening time may be longer than the beacon interval to have some tolerance for delayed beacon transmissions. For instance, the channel may be busy at TBTT, so the beacon may be transmitted after the channel is idle again. As an example, for a 2.4 GHz band with 3 non-overlapping channels, a corresponding passive scanning time for these 3 non-overlapping channels can be 480 ms (e.g., 3 channels*160 ms=480 ms.)

Figure 12:
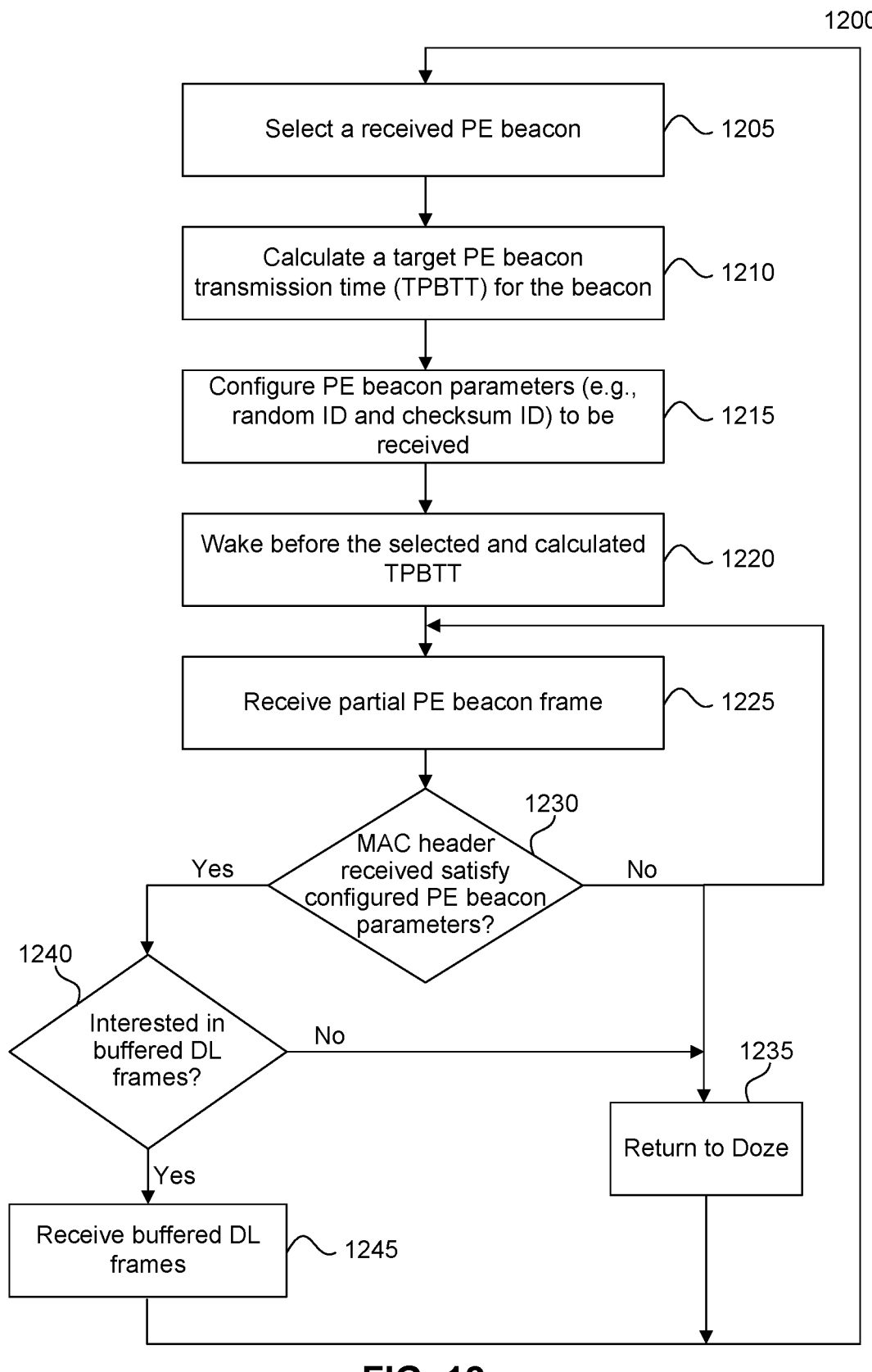
FIG. 12 illustrates an example method for a PE STA utilizing PE beacon frames, according to some embodiments of the disclosure.

FIG. 12 illustrates example method 1200 for a PE STA utilizing PE beacon frames, according to some embodiments of the disclosure. For explanation purposes and not a limitation, FIG. 12 may be described with reference to elements from other figures in the disclosure. For example, method 1200 may be performed by PE STA 130 and/or PE STA 170 of FIG. 1 or system 200 of FIG. 2.

At 1205, PE STA 170 can select the received beacon. For instance, if a PE STA has got unicast DL frames, the PE STA may wake up for the next PE beacon to check if there are more DL frames coming. If no DL frames are received, the PE STA may wake up to receive the next group addressed frames, or the PE STA may save power and wake up again only for a PE beacon that is transmitted after a long time. If the PE STA is multilink device, the PE STA may only wake up to receive PE beacons in one of the links of the multiple links.

At 1210, PE STA 170 can calculate a Target PE Beacon Transmission Time (TPBTT) for the beacon.

At 1215, PE STA 170 can configure PE beacon parameters (e.g., random ID and checksum ID) to be received.

At 1220, PE STA 170 can wake before the selected and calculated TPBTT.

At 1225, PE STA 170 can receive a partial PE beacon frame, at least the MAC header and Change Sequence Number 720.

At 1230, PE STA 170 determines whether the MAC Header of the PE beacon frame received satisfies the configured beacon parameters (e.g., random ID and checksum ID substantially matches the configured random ID and checksum ID from beacon update elements as listed in Table 7.) When the received parameters (e.g., elements) match with the configured PE beacon parameters, and the Change Sequence Number of the PE beacon frame matches with the saved Change Sequence Number of the last received PE beacon frame, then the receiver knows that BSS parameters have not changed. Thus, the receiver may not need to receive and parse the remainder of the PE beacon frame field, or the receiver may parse only selected elements like TIM. If the Change Sequence Number does not match with the saved value, then the PE STA receives the complete PE beacon frame (e.g., the remainder of the PE beacon frame.)

The received PE beacon frame may not be for the PE STA (e.g., MAC header of the PE beacon frame does not satisfy the configured beacon parameters) and the PE STA may continue to receive and try to receive a PE beacon frame. Method 1200 returns to 1225.

In some examples, the PE STA may stop receiving the PE beacon frame and consider that the PE beacon frame is lost. Method 1200 then proceeds to 1235. In this case, the STA selects the next PE beacon to receive 1205. If the received PE beacon frame is for the PE STA, method 1200 proceeds to 1240.

At 1235, when the configured PE beacon parameters are not satisfied, PE STA 170 returns to a doze state, and method 1200 returns to 1205.

At 1240, when the configured PE beacon parameters are satisfied, PE STA 170 determines whether there is interest in the buffered DL frames (e.g., based on TIM or if a change sequence number indicates a pending change). When PE STA 170 is not interested in the buffered DL frames, method 1200 returns to 1235. Otherwise, method 1200 proceeds to 1245.

At 1245, PE STA 170 receives the buffered DL frames.

Figure 13:
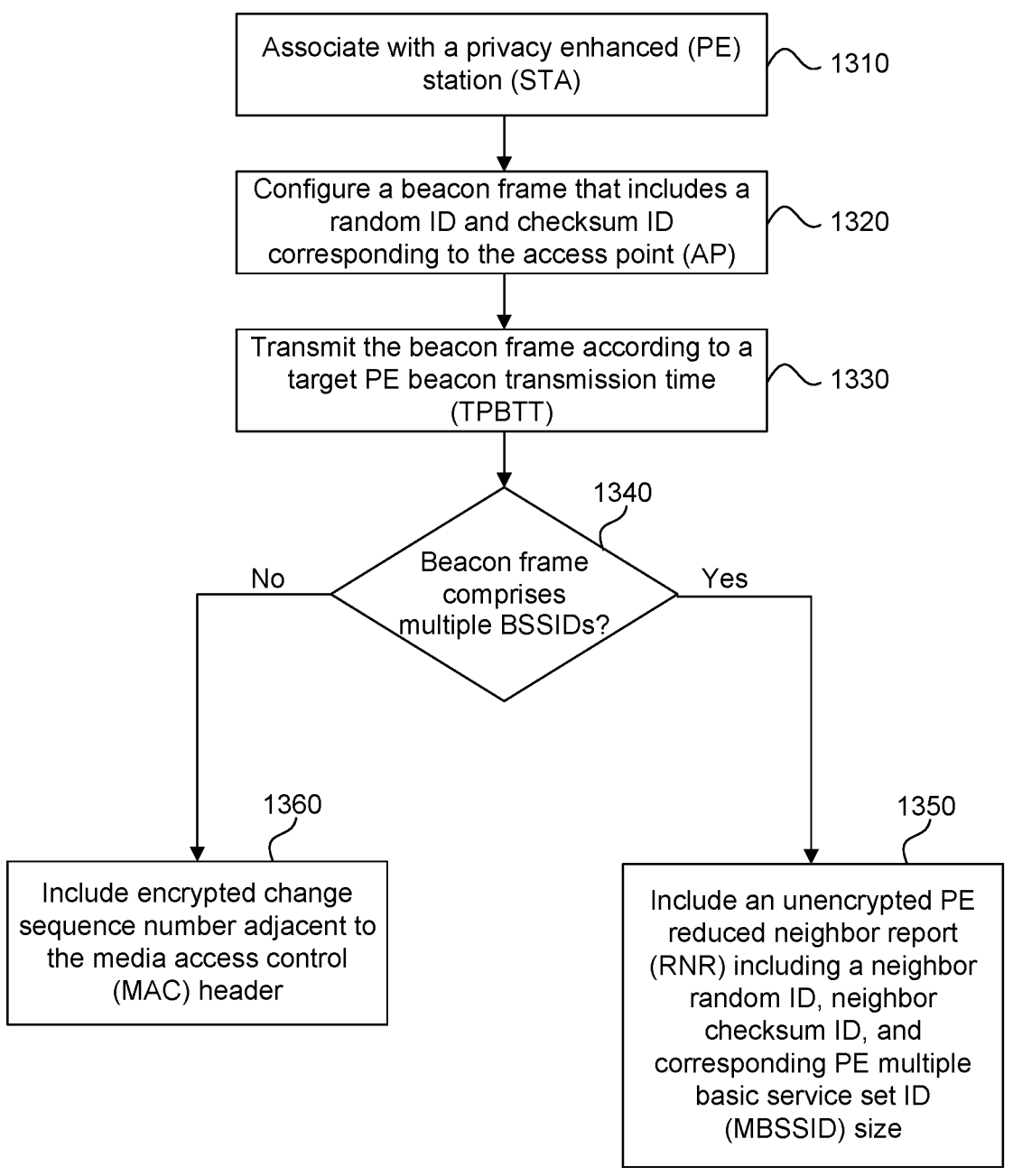
FIG. 13 illustrates an example method for a PE AP utilizing PE beacon frames, according to some embodiments of the disclosure.

FIG. 13 illustrates example method 1300 for a PE AP utilizing PE beacon frames, according to some embodiments of the disclosure. For explanation purposes and not a limitation, FIG. 13 may be described with reference to elements from other figures in the disclosure. For example, method 1300 may be performed by AP 110, PE AP 114, and/or PE AP 160 of FIG. 1 or system 200 of FIG. 2.

At 1310, PE AP 160 can associate with a privacy enhanced (PE) station (STA).

At 1320, PE AP 160 can configure a PE beacon frame that includes a random ID and checksum ID corresponding to PE AP 160.

At 1330, PE AP 160 can transmit the PE beacon frame according to a target PE beacon transmission time (TPBTT).

At 1340, PE AP 160 can determine whether the PE beacon frame includes multiple PE BSSIDs. When the PE beacon frame (e.g., a PE discovery beacon frame) includes multiple PE BSSIDs, method 1300 proceeds to 1350. Otherwise, method 1300 proceeds to 1360.

At 1350, PE AP 160 includes an unencrypted PE reduced neighbor report (RNR) in the PE discovery beacon frame where the PE RNR includes a neighbor random ID, neighbor checksum ID, and corresponding PE multiple basic service set ID (MBSSID) size that corresponds to a neighbor PE BSS specific info field that is encrypted. The PE AP repeats the BSS information addition to PE RNR and the PE BSS specific information for each BSS which information is added to the PE discovery beacon frame.

At 1360, PE AP 160 includes an encrypted change sequence number adjacent to a MAC header field (e.g., the PE AP transmits an encrypted PE beacon frame.)

Figure 15A:
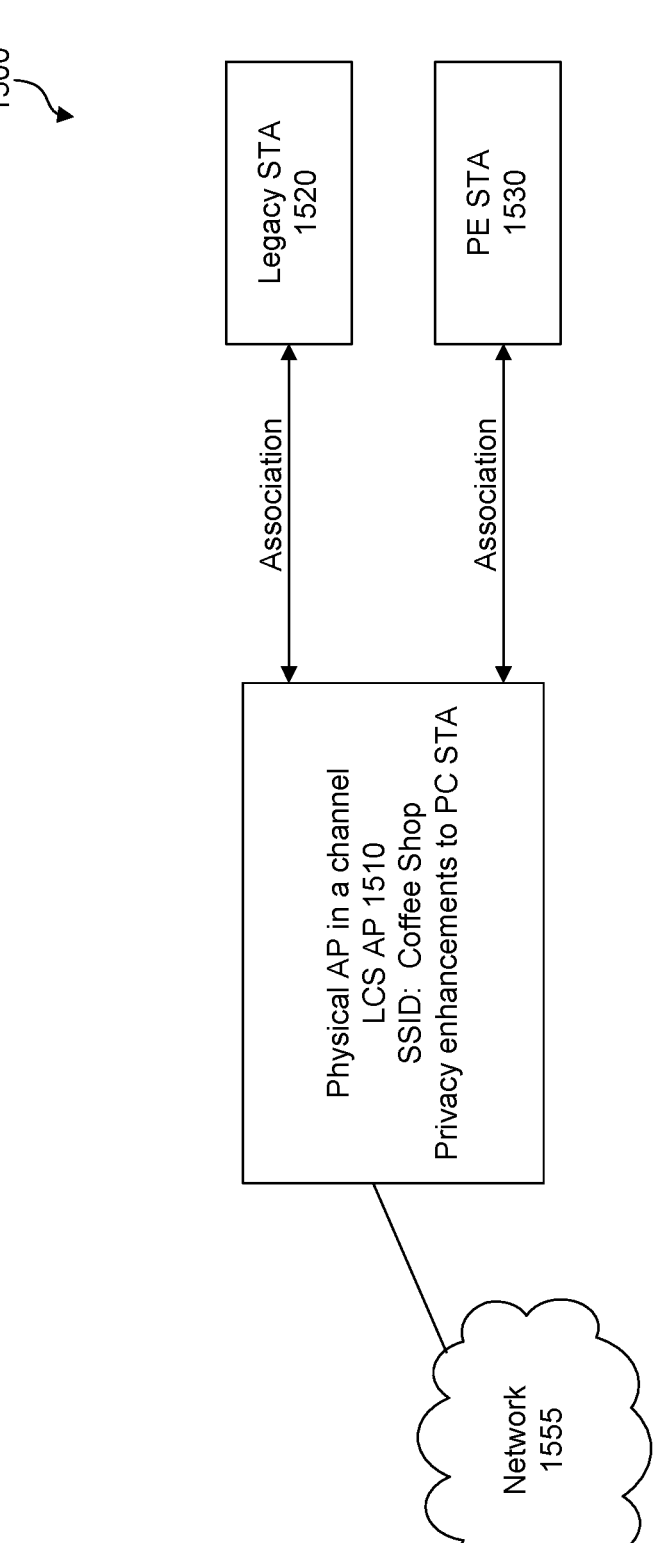
FIG. 15A illustrates an example system supporting a legacy beacon frame carrying PE BSS(s) information, in accordance with some embodiments of the disclosure.

FIG. 15A illustrates example system 1500 supporting a legacy beacon frame carrying PE BSS(s) information, in accordance with some embodiments of the disclosure. Example system 1500 includes legacy STA compatible (LSC) AP 1510 with a BSS with an SSID (e.g., "Coffee shop"). LSC AP 1510 can associate with legacy STA 1520 and PE STA 1530 and LSC AP 1510 can access network 1555. For explanation purposes and not a limitation, FIG. 15A may be described with reference to elements from other figures in the disclosure. For example, network 1555 may be the same as network 150 of FIG. 1, and PE STA 1530 may correspond to PE STA 130 or PE STA 170 of FIG. 1. LSC AP 1510 is not suitable for use cases that require AP privacy, like Mobile AP, or AP in a car. While LSC AP 1510 privacy cannot be improved, LSC AP 1510 can include privacy enhancements for PE STA 1530.

Figure 15B:
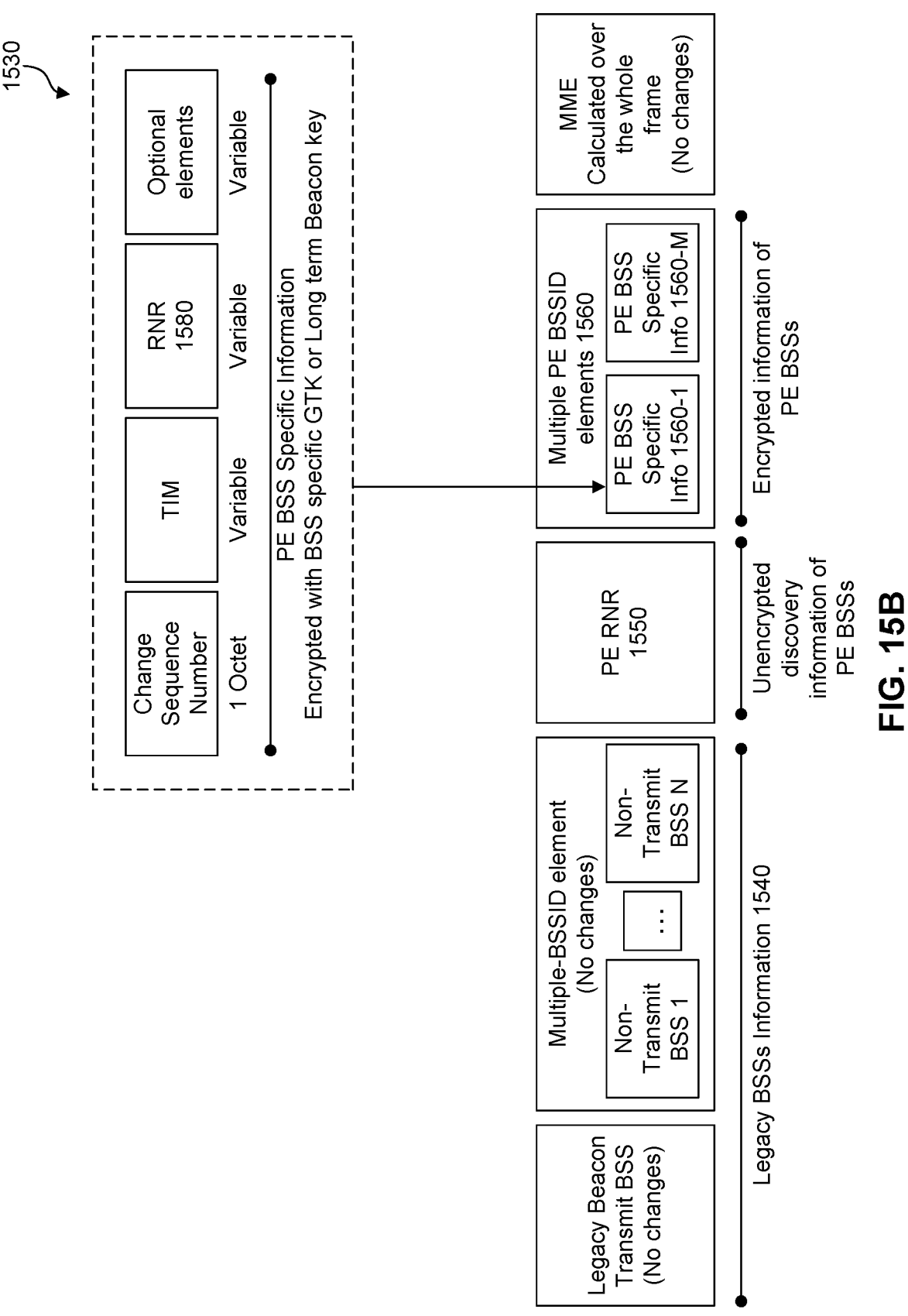
FIG. 15B illustrates an example of a legacy beacon frame format with PE BSS information, according to some embodiments of the disclosure.

FIG. 15B illustrates example 1530 of a legacy beacon format with PE BSS information, according to some embodiments of the disclosure. For explanation purposes and not a limitation, FIG. 15B may be described with reference to elements from other figures in the disclosure. For example, PE RNR 1550 may correspond to PE RNR 950 of FIG. 9B and RNR 1580 may correspond to RNR 750 of FIG. 7A, respectively. Example 1530 includes legacy BSSs information 1540 and PE RNR 1550 includes information including sizes for PE BSS Specific Info subelements (e.g., for each PE BSS, a corresponding size of PE BSS specific info 1560-1 through 1560-M are included).

Figure 14:
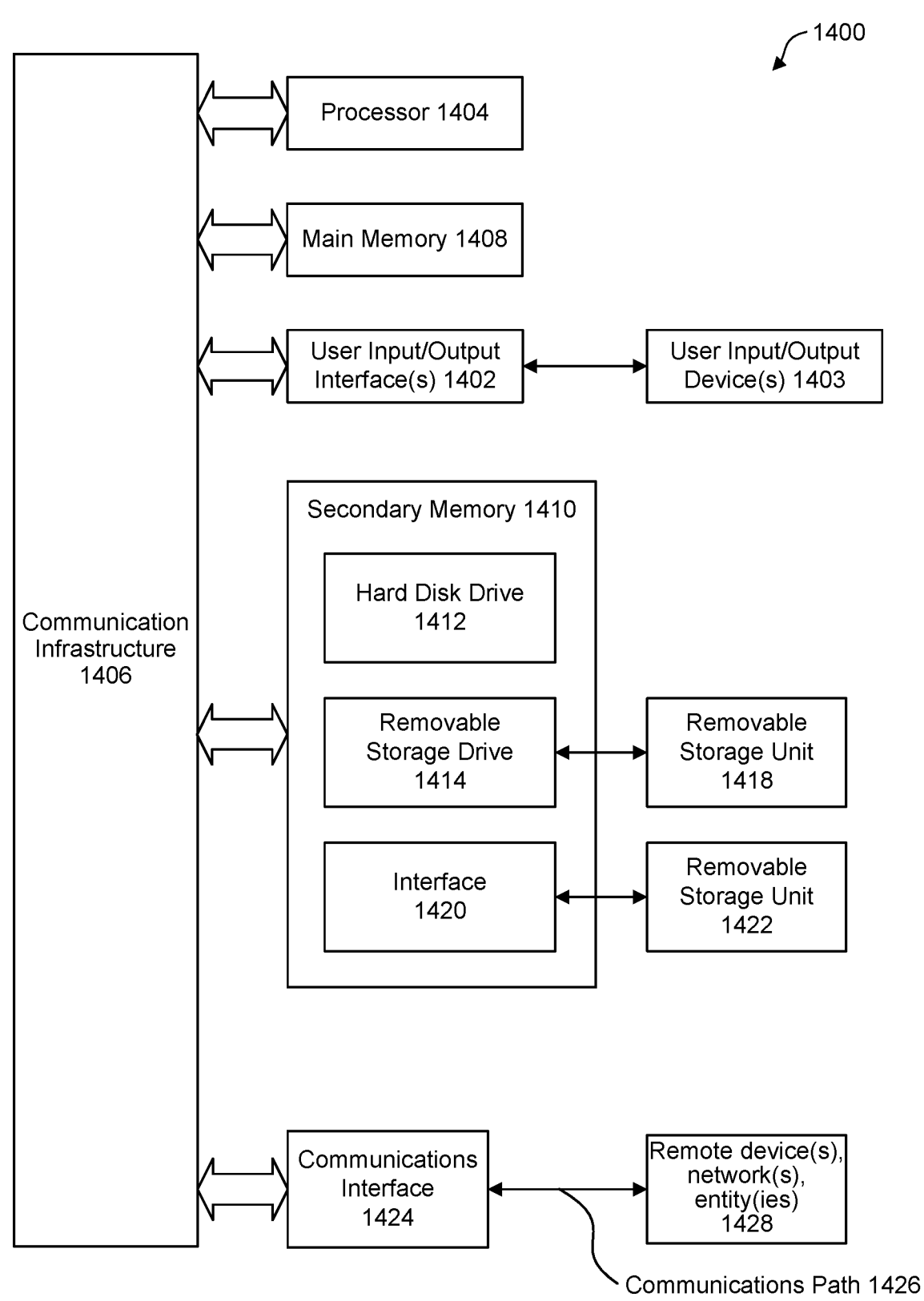
FIG. 14 illustrates an example computer system for implementing some embodiments or portion(s) thereof.

Various embodiments can be implemented, for example, using one or more well-known computer systems, such as computer system 1400 shown in FIG. 14. Computer system 1400 can be any well-known computer capable of performing the functions described herein. For example, and without limitation, AP 110, PE AP 114, PE STA 130, PE AP 160, PE STA 170 of FIG. 1, PE STA 1530, LSC AP 1510 of FIG. 15, system 200 of FIG. 2, method 1200 of FIG. 12, method 1300 of FIG. 14, (and/or other apparatuses and/or components shown in the figures) may be implemented using computer system 1400, or portions thereof.

Computer system 1400 includes one or more processors (also called central processing units, or CPUs), such as a processor 1404. Processor 1404 is connected to a communication infrastructure 1406 that can be a bus. One or more processors 1404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1400 also includes user input/output device(s) 1403, such as monitors, keyboards, pointing devices, etc., that communicate with communication infrastructure 1406 through user input/output interface(s) 1402. Computer system 1400 also includes a main or primary memory 1408, such as random access memory (RAM). Main memory 1408 may include one or more levels of cache. Main memory 1408 has stored therein control logic (e.g., computer software) and/or data.

Computer system 1400 may also include one or more secondary storage devices or memory 1410. Secondary memory 1410 may include, for example, a hard disk drive 1412 and/or a removable storage device or drive 1414. Removable storage drive 1414 may be a floppy disk drive, a magnetic tape drive, a compact disk drive, an optical storage device, tape backup device, and/or any other storage device/drive.

Removable storage drive 1414 may interact with a removable storage unit 1418. Removable storage unit 1418 includes a computer usable or readable storage device having stored thereon computer software (control logic) and/or data. Removable storage unit 1418 may be a floppy disk, magnetic tape, compact disk, DVD, optical storage disk, and/any other computer data storage device. Removable storage drive 1414 reads from and/or writes to removable storage unit 1418 in a well-known manner.

According to some embodiments, secondary memory 1410 may include other means, instrumentalities or other approaches for allowing computer programs and/or other instructions and/or data to be accessed by computer system 1400. Such means, instrumentalities or other approaches may include, for example, a removable storage unit 1422 and an interface 1420. Examples of the removable storage unit 1422 and the interface 1420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1400 may further include a communication or network interface 1424. Communication interface 1424 enables computer system 1400 to communicate and interact with any combination of remote devices, remote networks, remote entities, etc. (individually and collectively referenced by reference number 1428). For example, communication interface 1424 may allow computer system 1400 to communicate with remote devices 1428 over communications path 1426, which may be wired and/or wireless, and which may include any combination of LANs, WANs, the Internet, etc. Control logic and/or data may be transmitted to and from computer system 1400 via communication path 1426.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1400, main memory 1408, secondary memory 1410 and removable storage units 1418 and 1422, as well as tangible articles of manufacture embodying any combination of the foregoing. Such control logic, when executed by one or more data processing devices (such as computer system 1400), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 14. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A privacy enhanced (PE) station (STA), comprising:
a transceiver; and
a processor communicatively coupled to the transceiver, configured to:
   receive, via the transceiver, a PE beacon frame comprising a media access control (MAC) header having a first random identifier (ID) and a first checksum ID that both correspond to an affiliated PE access point (AP) of a PE AP multilink device (MLD);
   select an AP MLD ID of the PE AP MLD;
   determine a checksum value using the AP MLD ID and the first random ID;
   determine that the first checksum ID corresponds in a predetermined manner to the checksum value; and
   process, subsequent to the determination that the first checksum ID corresponds in the predetermined manner to the checksum value, the PE beacon frame.

2. The PE STA of claim 1, wherein the MAC header comprises an extension type and subtype corresponding to an encrypted PE beacon frame or a PE discovery beacon frame.

3. The PE STA of claim 2, wherein the MAC header further comprises a broadcast address.

4. The PE STA of claim 2, wherein the first random ID comprises at least 8 octets.

5. The PE STA of claim 1, wherein an encrypted change sequence number is adjacent to the MAC header in the PE beacon frame, and wherein the processor is further configured to:
   determine whether a change sequence number of the encrypted change sequence number has changed from a previous PE beacon frame; and
   terminate reception of one or more remaining portions of the PE beacon frame when the change sequence number has changed.

6. The PE STA of claim 1, wherein the processor is further configured to:
   associate with the affiliated PE AP; and
   determine that one or more elements of a PE basic service set (BSS) corresponding to the affiliated PE AP will be updated.

7. The PE STA of claim 6, wherein the one or more elements of the PE BSS comprise a number of target beacon transmission times (TBTTs) until a second PE beacon frame including an update of the one or more elements is received.

8. The PE STA of claim 1, wherein the PE beacon frame comprises a non-encrypted reduced neighbor report (RNR) element that includes a second random ID, a second checksum ID, and a PE multiple basic service set ID (MBSSID) size corresponding to a neighbor PE AP.

9. The PE STA of claim 8, wherein the PE MBSSID size corresponds to a size of encrypted PE BSS information of the neighbor PE AP.

10. The PE STA of claim 9, wherein the encrypted PE BSS information comprises a second RNR for maintaining one or more links of the PE AP MLD with at least one other neighbor PE AP affiliated with the PE AP MLD.

11. The PE STA of claim 1, wherein the processor is further configured to:
   determine a target PE beacon transmission time (TPBTT) comprising a random time offset from a target beacon transmission time (TBTT), wherein the TPBTT does not change a timing synchronization function (TSF) timer corresponding to the affiliated PE AP transmitting the PE beacon frame.

12. The PE STA of claim 11, wherein the TPBTT occurs during a PE beacon randomization window duration based on a percentage of the TBTT.

13. A method for a privacy enhanced (PE) station (STA), comprising:
   receiving a PE beacon frame comprising a media access control (MAC) header having a first random identifier (ID) and a first checksum ID that both correspond to an affiliated PE access point (AP) of a PE AP multilink device (MLD);
   selecting an AP MLD ID of the PE AP MLD;
   determining a checksum value using the AP MLD ID and the first random ID;
   determining that the first checksum ID corresponds in a predetermined manner to the checksum value; and
   processing, subsequent to the determination that the first checksum ID corresponds in the predetermined manner to the checksum value, the PE beacon frame.

14. The method of claim 13, wherein an encrypted change sequence number is adjacent to the MAC header, the method further comprising:
   determining whether a change sequence number of the encrypted change sequence number has changed from a previous PE beacon frame; and
   terminating reception of a remaining portion of the PE beacon frame when the change sequence number has changed.

15. The method of claim 13, further comprising:
   associating with the affiliated PE AP; and
   determining that one or more elements of a PE basic service set (BSS) corresponding to the affiliated PE AP will be updated.

16. A non-transitory computer-readable medium storing instructions that, when executed by a processor of a privacy enhanced (PE) station (STA), cause the PE STA to perform operations, the operations comprising:
   receiving a PE beacon frame comprising a media access control (MAC) header having a first random identifier (ID) and a first checksum ID that both correspond to an affiliated PE access point (AP) of a PE AP multilink device (MLD); selecting an AP MLD ID of the PE AP MLD;
   determining a checksum value using the AP MLD ID and the first random ID;
   determining that the first checksum ID corresponds in a predetermined manner to the checksum value; and
   processing, subsequent to the determination that the first checksum ID corresponds in the predetermined manner to the checksum value, the PE beacon frame.

17. The non-transitory computer-readable medium of claim 16, wherein the MAC header comprises an extension type and subtype corresponding to an encrypted PE beacon frame or a PE discovery beacon frame, wherein the MAC header further comprises a broadcast address, or wherein the first random ID comprises at least 8 octets.

18. The non-transitory computer-readable medium of claim 16, wherein an encrypted change sequence number is adjacent to the MAC header in the PE beacon frame, and wherein the operations further comprise:

determining whether a change sequence number of the encrypted change sequence number has changed from a previous PE beacon frame; and terminating reception of one or more remaining portions of the PE beacon frame when the change sequence number has changed.

19. The non-transitory computer-readable medium of claim 16, wherein the operations further comprise:

associating with the affiliated PE AP; and determining that one or more elements of a PE basic service set (BSS) corresponding to the affiliated PE AP will be updated.

20. The non-transitory computer-readable medium of claim 16, wherein the first random ID changes periodically.

\* \* \* \* \*